US011714275B1

(12) United States Patent
Perkins et al.

(10) Patent No.: US 11,714,275 B1
(45) Date of Patent: Aug. 1, 2023

(54) DUAL PHOSPHOR WHEEL PROJECTION SYSTEM

(71) Applicant: CHRISTIE DIGITAL SYSTEMS USA, INC., Cypress, CA (US)

(72) Inventors: Michael Perkins, Kitchener (CA); Mang Li, Waterloo (CA); Abdul Waheed Salimi, Cambridge (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 17/994,138

(22) Filed: Nov. 25, 2022

(51) Int. Cl.
*G02B 26/00* (2006.01)
*G03B 21/16* (2006.01)
*G03B 21/20* (2006.01)

(52) U.S. Cl.
CPC .......... *G02B 26/008* (2013.01); *G03B 21/16* (2013.01); *G03B 21/204* (2013.01); *G03B 21/2066* (2013.01)

(58) Field of Classification Search
CPC .. G03B 21/16; G03B 21/204; G03B 21/2066; G03B 21/2033; G02B 26/008; G02B 27/141; G02B 27/149; F21Y 2115/30
See application file for complete search history.

(56) References Cited

U.S. PATENT DOCUMENTS

| 5,200,855 A | 4/1993 | Meredith, Jr. et al. |
| 8,915,597 B2 | 12/2014 | Kitano et al. |
| 9,024,241 B2 | 5/2015 | Wang et al. |

(Continued)

FOREIGN PATENT DOCUMENTS

| WO | 2008078299 A1 | 7/2008 |
| WO | 2011008627 A2 | 1/2011 |

(Continued)

OTHER PUBLICATIONS

Oh, Ji Hye, et al., "Highly-Efficient, Tunable Green, Phosphor-Converted LEDs Using a Long-Pass Dichroic Filter and a Series of Orthosilicate Phosphors for Tri-Color White LEDs", Optical Society of America, Optics Express, Jan. 2, 2012, vol. 20, No. S1, pp. A1-A12.

(Continued)

*Primary Examiner* — Jong-Suk (James) Lee
*Assistant Examiner* — Glenn Zimmerman
(74) *Attorney, Agent, or Firm* — Perry + Currier, Inc.

(57) ABSTRACT

A dual phosphor wheel projection system is provided. A first dichroic mirror directs blue light from a first blue laser to a second dichroic mirror which directs the blue light to at least one integrator. The first dichroic mirror directs blue light from a second blue laser to a first phosphor/phosphor wheel, which converts the blue light to longer wavelengths that includes red light. The second dichroic mirror directs the red light to the integrator and transmit others of the longer wavelengths. The integrator combines the red light with red light from a red laser. A third dichroic mirror directs the red light from the red laser to the integrator and directs blue light from a third blue laser to a second phosphor/phosphor wheel, which converts the blue light to respective longer wavelengths that includes green light. The third dichroic mirror transmits the green light to the integrator.

13 Claims, 12 Drawing Sheets

(56) References Cited

U.S. PATENT DOCUMENTS

| | | | |
|---|---|---|---|
| 9,075,299 B2 | 7/2015 | Hu et al. | |
| 9,274,407 B2 | 3/2016 | Wang et al. | |
| 9,476,573 B2 | 10/2016 | Mehl | |
| 9,612,511 B2 | 4/2017 | Hu | |
| 9,726,335 B2 | 8/2017 | Chang et al. | |
| 10,310,363 B2 | 6/2019 | Chang et al. | |
| 10,684,539 B2 | 6/2020 | Yamagishi et al. | |
| 10,688,527 B2 | 6/2020 | Hamamura | |
| 10,725,364 B2 | 7/2020 | Hamamura | |
| 10,802,267 B2 | 10/2020 | Chen et al. | |
| 11,221,551 B2 | 1/2022 | Hamamura | |
| 2011/0150019 A1 | 6/2011 | Leatherdale et al. | |
| 2012/0229780 A1* | 9/2012 | Sato | G03B 21/208 362/231 |
| 2013/0126930 A1 | 5/2013 | Kabuki et al. | |
| 2014/0347634 A1* | 11/2014 | Bommerbach | G03B 33/14 353/121 |
| 2018/0196338 A1 | 7/2018 | Bommersbach et al. | |
| 2020/0333697 A1* | 10/2020 | Tanaka | G03B 21/2066 |
| 2021/0063860 A1* | 3/2021 | Wong | H04N 9/3111 |
| 2021/0132484 A1* | 5/2021 | Tsao | G03B 21/208 |
| 2022/0026045 A1* | 1/2022 | Yamamoto | G02B 27/0955 |

FOREIGN PATENT DOCUMENTS

| | | | | |
|---|---|---|---|---|
| WO | 2011060619 A1 | 5/2011 | | |
| WO | WO-2015122001 A1 * | 8/2015 | | G03B 21/005 |

OTHER PUBLICATIONS

Oh, Jeong Rok, et al., "Full Down-Conversion of Amber-Emitting Phosphor-Converted Light-Emitting Diodes With Powder Phosphors and a Long-Wave Pass Filter", Optical Society of America, Optics Express, May 4, 2010, vol. 18, No. 11, pp. 11064-11072.

Packer, Orin, et al., Characterization and Use of a Digital Light Projector for Vision Research, Vision Research 41 (2001) pp. 427-439; https://pubmed.ncbi.nlm.nih.gov/11166046/.

\* cited by examiner

DUAL PHOSPHOR WHEEL PROJECTION SYSTEM

BACKGROUND

Laser Phosphor (LaPh) projection systems often rely on a single phosphor wheel to perform a conversion of blue laser light into red and green light. As phosphor generated light tends to be desaturated, these systems may require a color wheel be placed in cascade with the phosphor wheel in order to achieve acceptable colorimetry for use in video projection systems. The color wheel spins mechanically which imposes a limitation on how quickly different primary colors can be switched. This in turn leads to a reduction in brightness due to spoke time (e.g. transition time between colors), and visual artifacts due to the limited color cycling rate.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
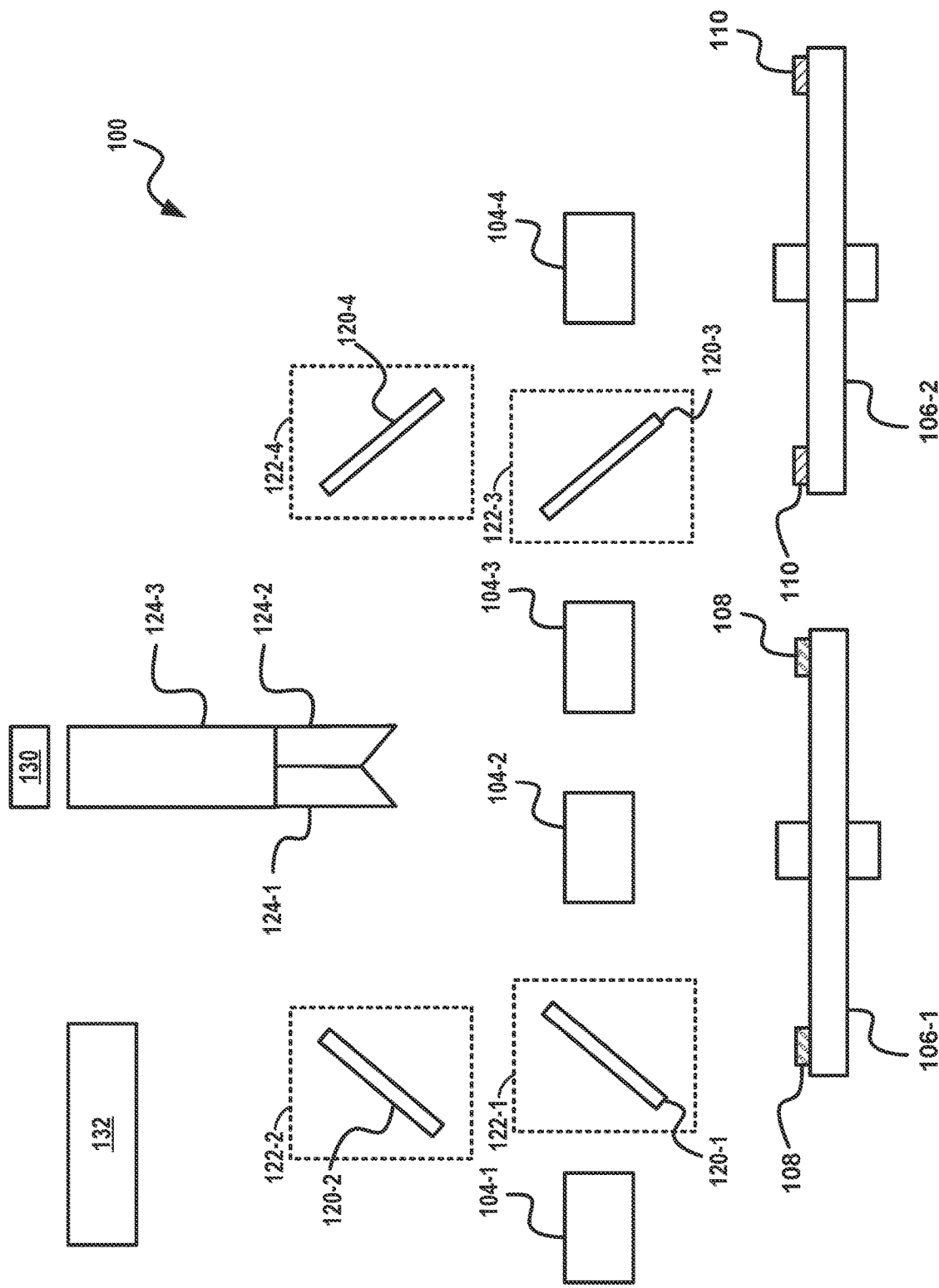
FIG. 1 depicts a dual phosphor wheel projection system, according to non-limiting examples.

Video projection systems generally use a source of light and there are many different types of sources of light. Human perception of color depends on receptors in the retina, referred to as cones. These cones come in three varieties, referred to as L, M, and S (Long, Medium, and Short). The terminology is a reference to the wavelength of light each cone type is most sensitive to. The color model can be simplified to state the individual cones are sensitive to red, green, or blue light. This then implies a source of light for a video projection systems should include sources of red, green, and blue (RGB) light.

Historically, white lamps have been used as the light source. These lamps are then filtered to generate the individual red, green, and blue components. Some video projection systems use three independent Spatial Light Modulators (SLMs) to form images. In these systems, the three color components are separated spatially, and directed to the individual SLM devices, and then recombined. In other systems (e.g. 1-Chip systems using one SLM), the separation occurs temporarily. A common approach in these systems is to place a set of dichroic filters around the circumference of a wheel, place the wheel between the white light source and the SLM and then spin the wheel at a high speed. In a single SLM system (e.g. a 1-Chip system), the SLM is then synchronized to the colors emitted via the spinning wheel to generate alternating sequences of red, green, and blue sub images which combine to make a perceived single image by the viewer.

The primary drawback of this approach is the limited life span of lamps that provide white light, which lead to frequent replacement of such lamps. An alternative approach is to use solid state illumination (SSI), which comes in several varieties. These include Light Emitting Diodes (LEDs), and direct laser illumination. While LED may be effective in low brightness applications, the large etendue of LED lights sources inherently limits how much light can be coupled onto an SLM. Direct laser (e.g. using RGB lasers and/or red lasers, green lasers and blue lasers) takes advantage of the very small etendue individual laser beams have. Multiple lasers can easily be combined onto a single SLM allowing very high brightness to be achieved. The main drawback is cost: green and red lasers, especially, that produce enough light for use in a video projection system tend to be very expensive. A second drawback is speckle, which is an image artifact caused by the use of coherent light and is generally considered to be visually distracting.

The present specification utilizes a Laser-Phosphor (LaPh) hybrid approach that includes relatively low cost blue lasers. For example, as described herein, a blue laser is used as a source of blue light, for example to illuminate an SLM. Such a blue laser is also used to illuminate a phosphorous material (e.g. a phosphor), which will then emit broader band light at wavelengths longer than the blue light of the laser, and which is filtered (e.g. using dichroic mirrors) to generate red light and/or green light.

In some LaPh systems, a single phosphor wheel is used in conjunction with a color wheel. For example, a blue laser may be combined with two spinning wheels, a segmented phosphor wheel and a segmented color wheel. The segmented phosphor wheel may have two segments: a transparent segment, and a phosphor segment coated with a phosphor that emits yellow light (e.g. a combination of red light and green light) when illuminated by blue light. The segmented color wheel second consists of a transparent segment, a red dichroic filter segment, and a green dichroic filter segment. The wheels are spun in a synchronous manner and the blue laser is operated continuously. During "red" time, the blue laser shines directly on the phosphor which emits yellow light, which is directed to the red filter on the color wheel resulting in red light which is directed towards an SLM. During "green" time, the blue laser continues to shine on the phosphor which emits yellow light, which is directed to the green filter on the color wheel resulting in green light which is directed towards the SLM. During "blue" time the blue laser shines through the transparent segments of the segmented phosphor wheel and the segmented color wheel, which is directed towards the SLM, for example using a fold mirror which directs the blue light to a dichroic combiner where it is relayed to the SLM.

LaPh systems have several drawbacks.

A first problem of LaPh systems is referred to as "quenching", which is a well-known limitation of phosphor materials. The process of converting blue light into yellow light is not 100% efficient. In a phosphor wheel design, the conversion process will have under ideal conditions an efficiency of about 50%. The bulk of the losses will be absorbed by the phosphor material causing it to heat. As the heat rises the efficiency drops causing even more heating. This potentially leads to a thermal runaway situation and puts a limitation on the total amount of light that can be generated. Hence, phosphor materials may have a "quenching limit", which may be a maximum amount of excitation power input to the phosphor material before the efficiency begins to degrade (e.g. decrease) due to heating. The quenching problem may be especially problematic when generating red light as many phosphors used in LaPh systems do not tend to efficiently generate red light.

A second problem of LaPh systems is achieving "deeper" reds. For example, phosphor materials that emit "red" light tend to emit light of wavelengths that range from yellow to orange, with a tail of the orange light including some red light. Such phosphor materials be referred as being "red deficient". While increasing the percent of relative display time allocated to red may partially alleviate this problem, in general such an approach may affect the color cycle time. While adding more blue lasers may also mitigate the problem, for example to illuminate the yellow-orange phosphor with two or more lasers, such an approach may cause the phosphor approach or exceed the quenching limit.

A third problem of LaPh systems is referred to as "spoke time". The light impinging on the phosphor wheel, and again on the color wheel, will have a physical spot size. As the total amount of power goes up the spot size will tend to increase. As the color wheel spins it will not transition between colors instantaneously. Rather, there will be an intermediate period where the color is some combination of starting and ending colors. This transition period or "spoke" light cannot be used as a primary color. Although techniques exist to recapture the spoke light and use it as white light, in general the system efficiency is negatively impacted by this spoke.

A fourth problem of LaPh systems is a limited number of color cycles per video frame. The human eye is generally able to detect changes in an image. This is especially true if the eye is moving. When generating full color images from a sequential series of pure RGB sub-images the frequency of the sub-images should be very high in order to escape detection. For 60 Hz video, to escape detection 12× (720 Hz) or higher may be required. However, each color cycle introduces spoke time (e.g. time to transition between colors). The more color cycles the more spokes. This reduces the time available for pure colors and puts a practical limit on the order of 6× (360 Hz) on a color wheel system.

As such, provided herein is a dual color wheel system for a projector that generally mitigates the various problems described above using three blue lasers, one red laser, and independent, non-segmented, phosphor wheels. The first phosphor wheel includes a phosphor that emits in a range of yellow to orange wavelengths (e.g. see FIG. 8), including a relatively small amount of red wavelengths. The second phosphor wheel includes a phosphor that emits in a range of green to yellow wavelengths (e.g. see FIG. 8).

A first blue laser is a source of blue light which does not make use of the phosphor wheels. Speckling effects from the first blue laser may be mitigated using integrators and/or diffusers in projection optics, and the like. Furthermore, a wavelength of the first blue laser may be selected to achieve a given blue color point for the system.

Blue light from a second blue laser impinges on the first phosphor of the first phosphor wheel which emits light in a range of yellow to red wavelengths, which is filtered using dichroic mirrors to output red light, which is combined with red light from the red laser (e.g., which does not make use of the phosphor wheels). Put another way, the red laser supplements the red light output by the first phosphor of the first phosphor wheel, and/or vice versa, allowing the first laser to be operated at below the quenching limit, while taking advantage of a lower power red laser than would be necessary if a higher power red laser were the only source of red light in the system; such a lower power red laser further tends to have a lower cost relative to such a higher power laser. Hence, the low output of red light by the blue laser/phosphor combination is supplemented by the red laser, or vice versa, and a wavelength of the red laser may be selected to achieve a given red color point for the system, and similarly the color point of the red light emitted by the phosphor may be "tuned" using dichroic mirrors, as described herein, to assist in achieving the given red color point for the system.

Blue light from a third blue laser impinges on the second phosphor of the second phosphor wheel which emits light in a range of green to yellow wavelengths, which is filtered using dichroic mirrors to output green light. The color point of the green light may be "tuned" using dichroic mirrors, as described herein.

The dual color wheel system may include other components, such as any suitable arrangement of dichroic mirrors to transmit, and/or reflect (as described herein) the red light, the green light and the blue light to one or more light integrators, which may provide the light to a spatial light modulator. The dichroic mirrors may further be configured to tune or filter the green light and the red light emitted by the phosphors.

In some examples, four dichroic mirrors may be used, while in other examples three dichroic mirrors may be used. Such dichroic mirrors are generally understood to reflect or direct some wavelengths of light, and transmit other wavelengths of light, and the wavelengths of light that are reflected or transmitted by a given dichroic mirror may be selected based on the wavelengths of light emitted by the first phosphor and the second phosphor, for example to "tune" the red light and the green light (and optionally the blue light) generated by the system provided herein.

The lasers may be operated in a sequence, for example by a controller (e.g. such as a processor and the like) for example to produce the red light, the blue light and the green light in a sequence (of any suitable order), which may be directed to one SLM which may be operated in a sequence, for example also by the controller, to generate corresponding red images, green images and blue images, which may be sequentially projected to form RGB images.

In general, the provided system may at least partially mitigate the aforementioned problems with of LaPh systems. For example, the quenching limit/deeper red problems are generally mitigated by supplementing the red light emitted by the first phosphor with red light emitted by the red laser. Spoke time is generally reduced e.g. compared to when a color wheel and a segmented phosphor wheel are used) as the phosphor wheels used herein are unsegmented and hence transitions between colors occur primarily by turning lasers on and off. Furthermore, reduction of spoke time generally increases a number of color cycles that may occur per video frame (e.g. compared to when a color wheel and a segmented phosphor wheel are used). Furthermore, as there are two sources of red light in the system, the red light emitted by the first phosphor and the red light emitted by the red laser, a lower power/lower cost red laser may be used. Furthermore, as there are two sources of red light in the provided system, one coherent (e.g., the red light emitted by the red laser) and one not coherent (e.g., the red light emitted by the first phosphor), speckle will be reduced relative to when only one coherent source of red light (e.g., the red laser) was used to provide red light.

An aspect of the present specification provides a dual phosphor wheel projection system comprising: a first laser to generate first blue light; a second laser to generate second blue light; a third laser to generate third blue light; a fourth laser to generate first red light; a first phosphor arranged on a first phosphor wheel; a second phosphor arranged on a second phosphor wheel; a first dichroic mirror; a second dichroic mirror; and a third dichroic mirror; at least one light integrator, wherein the first dichroic mirror is configured to direct the first blue light from the first laser to the second dichroic mirror, and the second dichroic mirror is configured to direct the first blue light from the first dichroic mirror to the at least one light integrator, wherein the first dichroic mirror is further configured to direct the second blue light from the second laser to the first phosphor, arranged on the first phosphor wheel, the first phosphor configured to convert the second blue light to longer wavelengths that includes second red light, wherein the second dichroic mirror is further configured to direct the second red light to the at least one light integrator and transmit others of the longer wavelengths, wherein the at least one light integrator combines the first red light and the second red light, wherein the third dichroic mirror is configured to: direct the first red light from the fourth laser to the at least one light integrator; and direct the third blue light from the third laser to the second phosphor, arranged on the second phosphor wheel, wherein the second phosphor configured to convert the third blue light to respective longer wavelengths that includes green light, wherein the third dichroic mirror is further configured to transmit the green light to the at least one light integrator.

Attention is next directed to FIG. 1, which depicts a dual phosphor wheel system 100, interchangeably referred to hereafter as the system 100. The system 100 comprises a plurality of lasers 104-1, 104-2, 104-3, 104-4 interchangeably referred to hereafter, collectively, as the lasers 104 and, generically, as a laser 104. This convention will be used elsewhere in the present specification.

The lasers 104 include: a first laser 104-1 to generate first blue light; a second laser 104-2 to generate second blue light; a third laser 104-2 to generate third blue light; and fourth laser 104-4 to generate first red light. Hence, the first laser 104-1, the second laser 104-2, and the third laser 104-3 may be respectively referred to herein as the first blue laser 104-1, the second blue laser 104-2, and the third blue laser 104-3; similarly, the fourth laser 104-4 may be referred to herein as the red laser 104-4 The operation of the lasers 104 will be described in more detail with respect to FIG. 3, FIG. 4, and FIG. 5.

The system 100 further comprises a first phosphor wheel 106-1 and a second phosphor wheel 106-2 (e.g. the phosphor wheels 106 and/or a phosphor wheel 106). In particular, the system 100 comprises a first phosphor 108 arranged on the first phosphor wheel 106-1 and a second phosphor 110 arranged on the second phosphor wheel 106-2. It is understood that the phosphor wheels 106 spin and/or rotate continuously while the system 100 is in operation, for example at respective speeds that are selected to prevent a given phosphor 108, 110 from being damaged by light from the lasers 104-2, 104-3 and/or selected to ensure that heat is distributed in a phosphor wheel 106 in a manner that reduce chances of a quenching limit from being reached (e.g. see FIG. 11, described in more detail below). In some examples, the phosphor wheels 106 may have some (e.g., slight) non-uniformities about a respective circumference; in these examples, spinning and/or rotation of the phosphor wheels 106 may be synchronized a color cycling rate (e.g., a rate at which the system 100 cycles through red, green and blue) to ensure those non-uniformities occur at same and/or similar times in the color cycle so that any variance in color due to the non-uniformities may be calibrated and/or corrected (e.g., by varying respective brightness and/or RGB ratios of images generated in the system 100).

Figure 7:
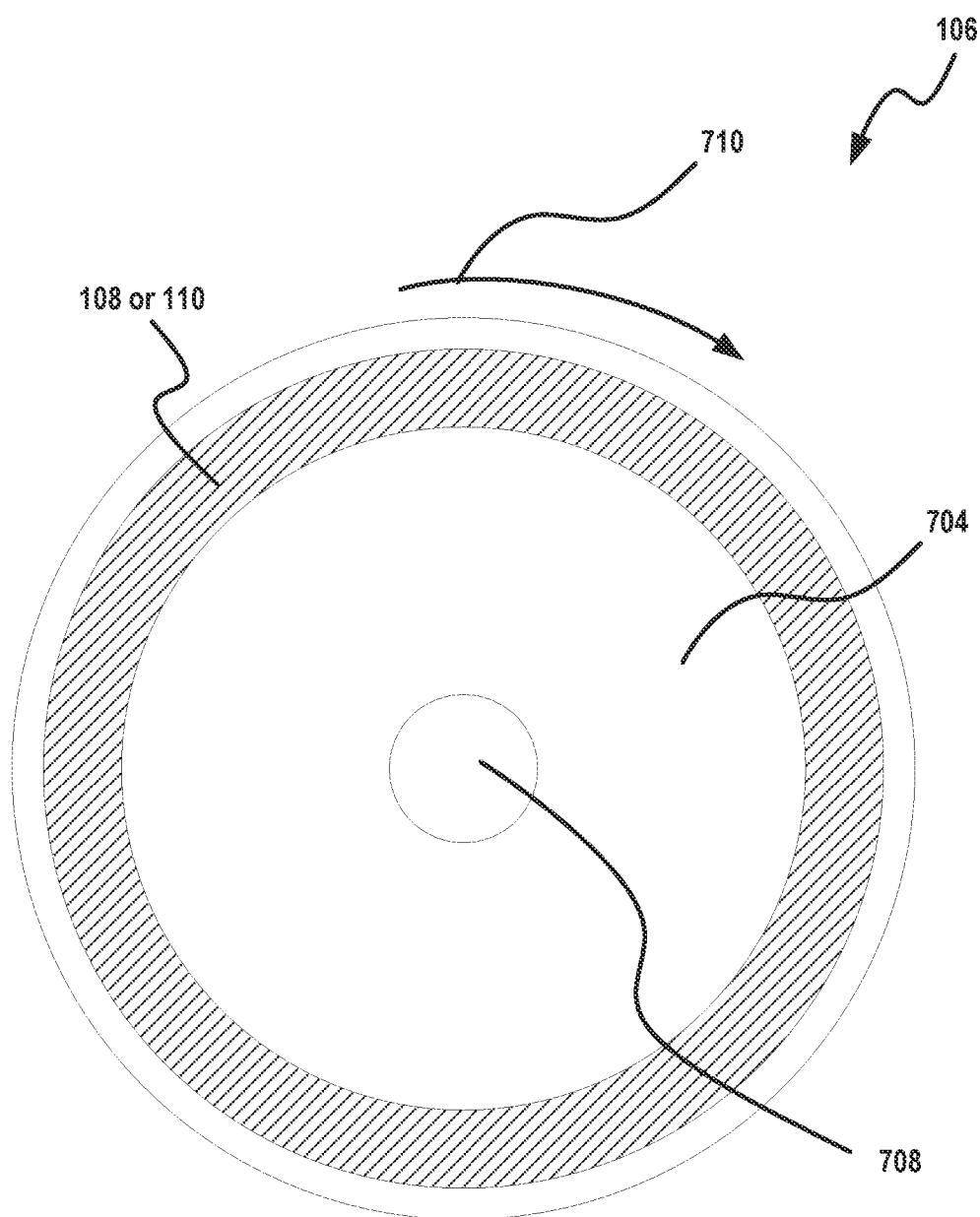
FIG. 7 depicts a phosphor wheel that may be used in the projection system of FIG. 1 or FIG. 2, according to non-limiting examples.

Attention is briefly directed to FIG. 7, which generically depicts a phosphor wheel 106, and is understood to comprise a plate 704, and the like, which as depicted may be circular, but may be any suitable shape. The plate 704 rotates around a hub 708, as represented by an arrow 710, for example via a motor (not depicted), with an unsegmented phosphor 108, 110 annularly arranged around the plate 704 (e.g. the phosphors 108, 110 form a respective annulus on a respective plate 704 and are continuous/unsegmented on a respective plate 704). The arrangement of components of the system 100, and dimensions of the plate 704 and an annulus formed by the first phosphor 108 or the second phosphor 110 are selected such that light from a laser 104, and in particular a blue laser 104-2, 104-3, impinges on a phosphor 108, 110 as the plate 704 rotates, exciting the phosphor 108, 110, and the phosphor 108, 110 emits light of longer wavelengths. The blue lasers 104-2, 104-3 are hence understood to be "pump" lasers as the blue lasers 104-2, 104-3 are used to "pump" and/or excite the phosphors 108, 110. Wavelength of the light emitted by a phosphor 108, 110 is understood to depend on a type and/or material of the phosphor 108, 110. Furthermore, rotation of the plate 704 is understood to distribute power and heat from a blue laser 104-2, 104-3 over an area to reduce the possibility of reaching a quenching limit of a phosphor 108, 110 (e.g. see FIG. 11, described in more detail below).

Furthermore, as will be described in more detail with respect to FIG. 4 and FIG. 5, the blue lasers 104-2, 104-3 that are used to excite a phosphor 108, 110 may be about 455 nm, but may also depend on a type and/or material of the phosphor 108, 110.

Figure 8:
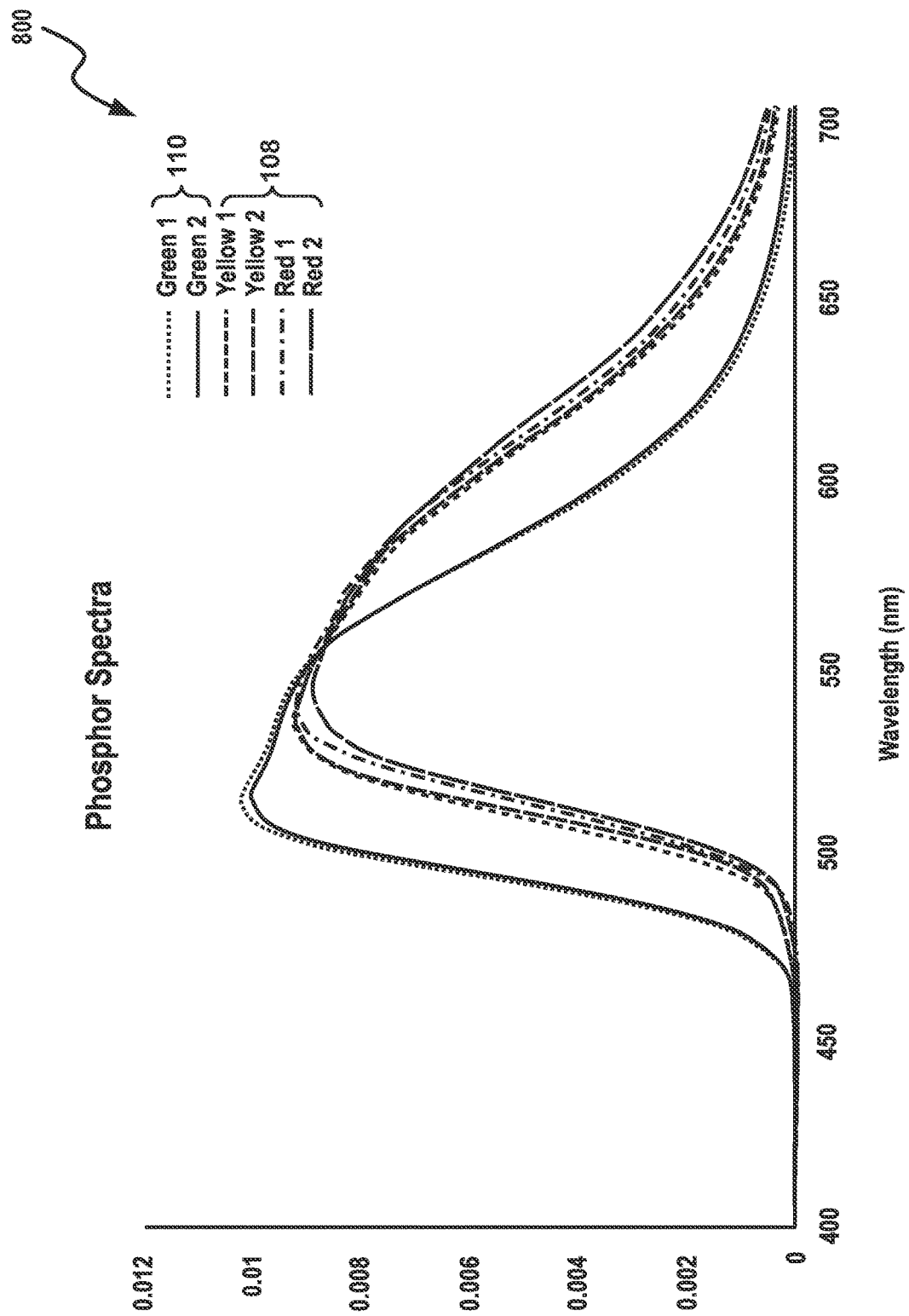
FIG. 8 depicts example phosphor spectra 800, according to non-limiting examples.

Attention is next briefly directed to FIG. 8 which depicts example phosphor spectra 800 of four examples of a phosphor 108, and two examples of a phosphor 110. In particular, each of the phosphor spectra 800 depict relative intensity of wavelengths of light output by a phosphor 108, 110 when excited by a blue laser 104-2, 104-3 of wavelength 455 nm.

The phosphors 108 are understood to emit wavelengths that range from about 500 nm to about 700 nm, or in a green to orange/red range, however, dominant (e.g. most intense)

wavelengths are in a yellow to orange/red range (e.g. 520 nm to 620 nm) with a tail of red wavelength light (e.g. 620 nm and above). Put another way, the first phosphor 108 may be configured to emit light in a range of yellow to red (or green to red) wavelengths. In general, a phosphor 108 is used as one source of red light in the system 100 (e.g. in addition to the red laser 104-4).

The phosphors 110 are understood to emit wavelengths that range from about 475 nm to about 650 nm, or in a green to yellow/orange range, however, dominant (e.g. most intense) wavelengths are in a green to yellow range (e.g. 500 nm to 560 nm) with a long tail that includes a relatively small amount of red wavelength light (e.g. 620 nm and above). Put another way, the second phosphor 110 may be configured to emit light in a range of in a range of green to yellow wavelengths. In general, a phosphor 110 is used as a source of green light in the system 100.

Furthermore, as understood from the phosphor spectra 800, some phosphors (e.g. a phosphor 108) are "richer" in relatively "shorter" wavelengths (e.g. as depicted, greens) and other phosphors (e.g. a phosphor 110) are "richer' in relatively "longer" wavelengths (e.g. as depicted, reds). In particular, the "green" phosphors 110 are richer in green light, and deficient in red light. In a single phosphor wheel type system, a green phosphor 110 would be an undesirable choice as not enough red light could be produced using a green phosphor 110 to meet RGB requirements (e.g. a given color point) of a projection system. In the present specification, however, a "green" phosphor 110 is only used to produce green light, and the red deficiency of such "green" phosphors 110 becomes an advantage since dichroic mirrors (described below) used to filter out wavelengths other than those corresponding to green, can be designed to reject and/or filter less light to achieve a given color point. Similarly, the "red-yellow" phosphors 108 are richer in red light, and deficient in green light; hence, use of a "red-yellow" phosphor 108, over a pure yellow phosphor, to generate red light may provide an improvement in efficiency to produce deeper red colors. Hence, the dual phosphor wheel system 100 described may enable the system 100 to output a very pure green light without compromising red performance, and to have a deeper red color without compromising green performance.

The phosphors 108, 110 may hence be of any suitable respective phosphor material which have the phosphor spectra 800 depicted in FIG. 8, or similar, and/or the phosphors 108, 110 may be of any suitable respective phosphor material. Put another way, the phosphor 108 may be of any suitable material, having any suitable phosphor spectrum that includes red light (e.g., in a range of about 620 nm to about 750 nm), and the phosphor 110 may be of any suitable material, having any suitable phosphor spectrum that includes green light (e.g., in a range of about 495 nm to about 750 nm).

Figure 2:
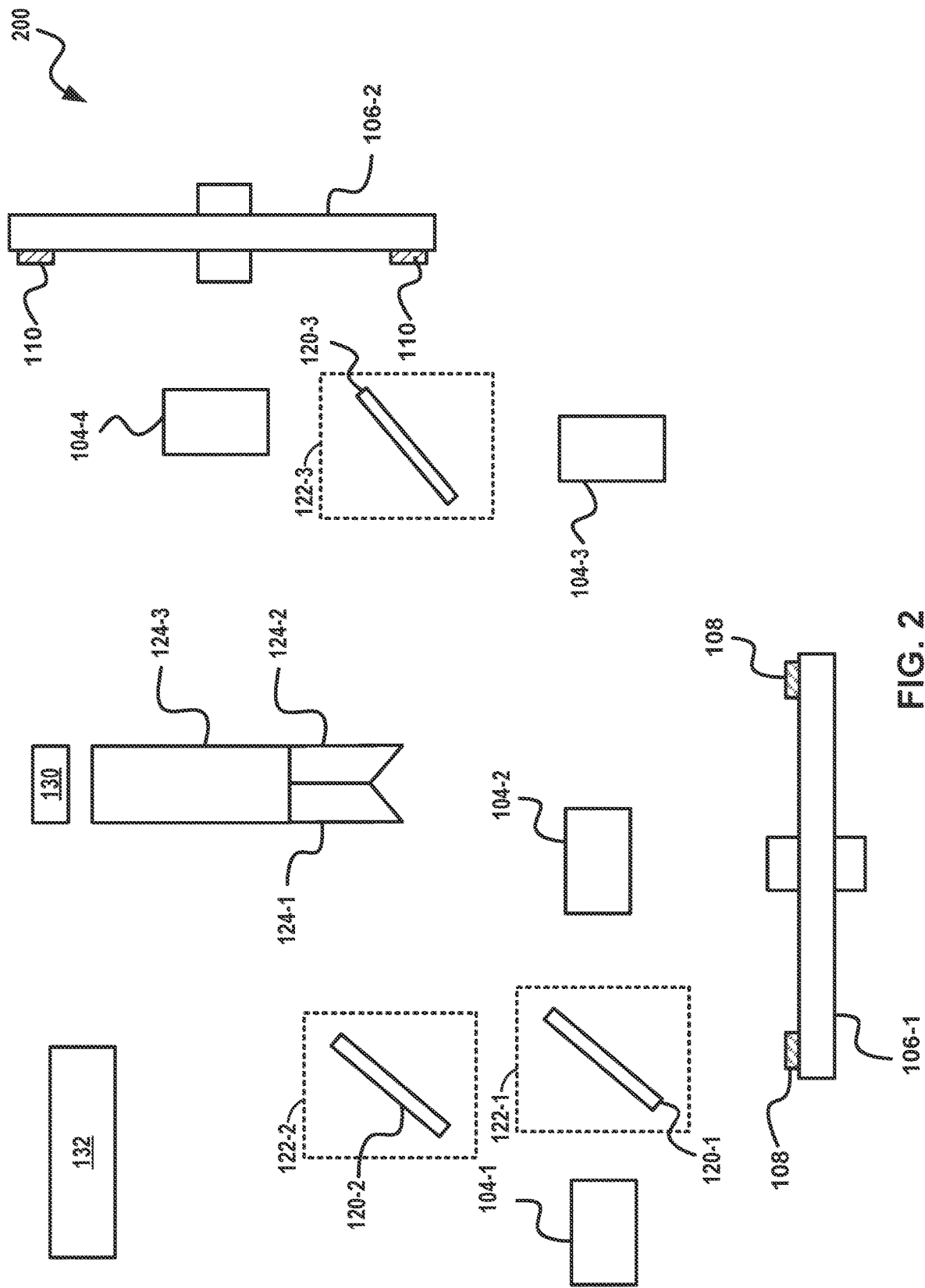
FIG. 2 depicts a dual phosphor wheel projection system, according to further non-limiting examples.

Returning to FIG. 1, the system 100 further comprises: a first dichroic mirror 120-1, a second dichroic mirror 120-2, a third dichroic mirror 120-3, and a fourth dichroic mirror 120-4 (e.g. dichroic mirrors 120 and/or a dichroic mirror 120). As will be explained with reference to FIG. 2 and FIG. 5, however, the fourth dichroic mirror 120-4 may be optional.

Furthermore, as depicted, the system 100 optionally comprises heat sinks 122-1, 122-2, 122-3, 122-4 (e.g. heat sinks 122 or a heat sink 122) integrated with and/or behind respective dichroic mirrors 120, for example to absorb heat from a respective laser 104 and/or lasers 104, and/or light, that interact with a dichroic mirror 120 and/or to absorb light that is discarded by a dichroic mirror 120. However, not all the dichroic mirrors 120 may be associated with a heat sink 122; rather, only those dichroic mirrors 120 that receive light directly from a laser 104 may be associated with a heat sink 122. For example, as will become apparent, the dichroic mirrors 120-1, 120-3 interact directly with the lasers 104, hence, the system 100 may include heat sinks 122-1, 122-3 only at dichroic mirrors 120-1, 120-3 which absorb light discarded by a dichroic mirror 120-1, 120-3 (e.g. not directed to a phosphor 108, 110 and/or not directed to another dichroic mirror 120). The heat sinks 122 are depicted in dashed lines to indicate their optionality.

Furthermore, as depicted, the system 100 further comprises at least one light integrator 124-1, 124-2, 124-3 (e.g. light integrators 124 or a light integrator 124, though the light integrators 124 or a light integrator 124 will be interchangeably referred to herein as integrators 124 or an integrator 124).

In particular, the dichroic mirrors 120 are understood to transmit or reflect certain respective ranges of wavelengths of light, for example towards a phosphor wheel 106, towards another dichroic mirror 120 and/or towards a light integrator 124 as will be explained in more detail below.

As will become apparent, in the system 100, the integrator 124-1 may receive light from the dichroic mirror 120-2 and the integrator 124-2 may receive light from the dichroic mirror 120-4. Furthermore, the integrators 124-1, 124-2 may direct light into the integrator 124-3, which may have an output end having an aspect ratio similar to, and/or the same as, a spatial light modulator (SLM) 130 of a projector of which the system 100 is a component.

In particular, the integrators 124 may comprise integrating rods that mix light received therein into a uniform distribution. As depicted, the integrators 124-1, 124-2 may both include a 45-degree section that acts as an internal fold mirror, for example upon which light from a respective dichroic mirror 120-2, 122-4 may impinge (e.g. see FIG. 3, FIG. 4 and FIG. 5) and be reflected towards the integrator 124-3, an input end of which is located at output ends of the integrators 124-1, 124-2. Hence, light from the dichroic mirror 120-2 will receive a first pass light integration through the integrator 124-1 and light from the dichroic mirror 120-4 will receive a first pass light integration through the integrator 124-2, and light from either or both of the integrators 124-1, 124-2 will receive a second pass light integration by the integrator 124-3 before being directed, for example, to an SLM 130, which may be component of the system 100, or a projection device external to the system 100 that receives light from the system 100. The integrators 124 may further be configured (e.g. be of respective lengths) to reduce and/or eliminate speckle due to the lasers 104-1, 104-4 and/or the system 100 may comprise one or more diffusers (not depicted) to reduce and/or eliminate such speckle.

The SLM 130 may include any suitable spatial light modulator such as a digital micromirror device (DMD), a liquid crystal on silicon (LCOS) device, and the like.

As depicted, the system 100 further comprises a controller 132, such as a processor and/or a plurality of processors, including but not limited to one or more central processors (CPUs) and/or one or more graphics processing units (GPUs) and/or one or more processing units; either way, the controller 132 comprises a hardware element and/or a hardware processor. In some implementations, the controller 132 can comprise an ASIC (application-specific integrated circuit) and/or an FPGA (field-programmable gate array) specifically configured to control the lasers 104, and to communicate with components controlling the SLM 130, for example to coordinate colors of light generated by the system 100 with images formed by the SLM 130. While not depicted, the system 100 may further comprise, and/or a projection device external to the system 100 that receives light from the system 100 may further comprise, a source of the images that the SLM 130 is to form, such as a video file, and the like, which may be stored at a memory (not depicted) and/or received via a communication interface (not depicted), and the like.

Furthermore, the system 100 may further comprise, or a projection device external to the system 100 that receives light from the system 100 may further comprise, projection optics between the output end of the integrator 124-3 and the SLM 130, and the like, a content player and/or generator and/or a rendering device (e.g. to "play" a video file, and the like), and/or any other suitable component used to play and/or project images.

As previously mentioned, the dichroic mirror 120-4 may be optional, however in this instance, a portion of the other components of the system are rearranged relative to the integrators 124-1, 124-2. For example, attention is directed to FIG. 2, which depicts a system 200 that is substantially similar to the system 100, with like components having like numbers. However, comparing the system 100, 200, it is apparent that the dichroic mirror 120-4 is omitted from the system 200, and furthermore the lasers 104-3, 104-4, the second phosphor wheel 106-2, and the dichroic mirror 120-3 are rotated 90° relative to the integrator 124-2. In particular, as will next be explained, the dichroic mirror 120-4 in the system 100 causes a 90° redirection/reflection of light from the dichroic mirror 120-3 into the integrator 124-2. Furthermore, as will also next be explained, while the dichroic mirror 120-4 may provide some further filtering of light from the dichroic mirror 120-3, such filtering may be optional.

Figure 3:
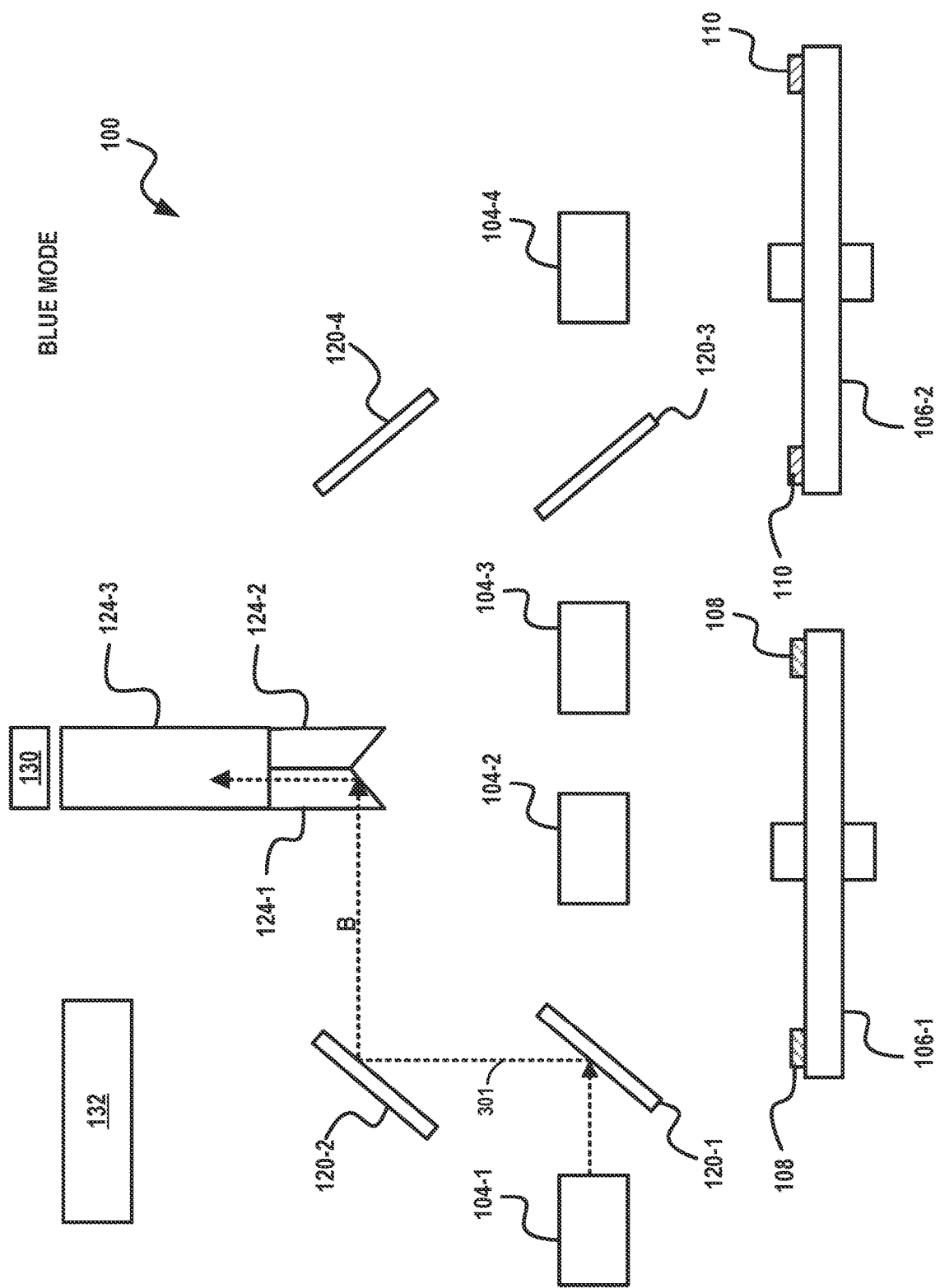
FIG. 3 depicts the dual phosphor wheel projection system of FIG. 1 in a blue mode, according to non-limiting examples.
Figure 4:
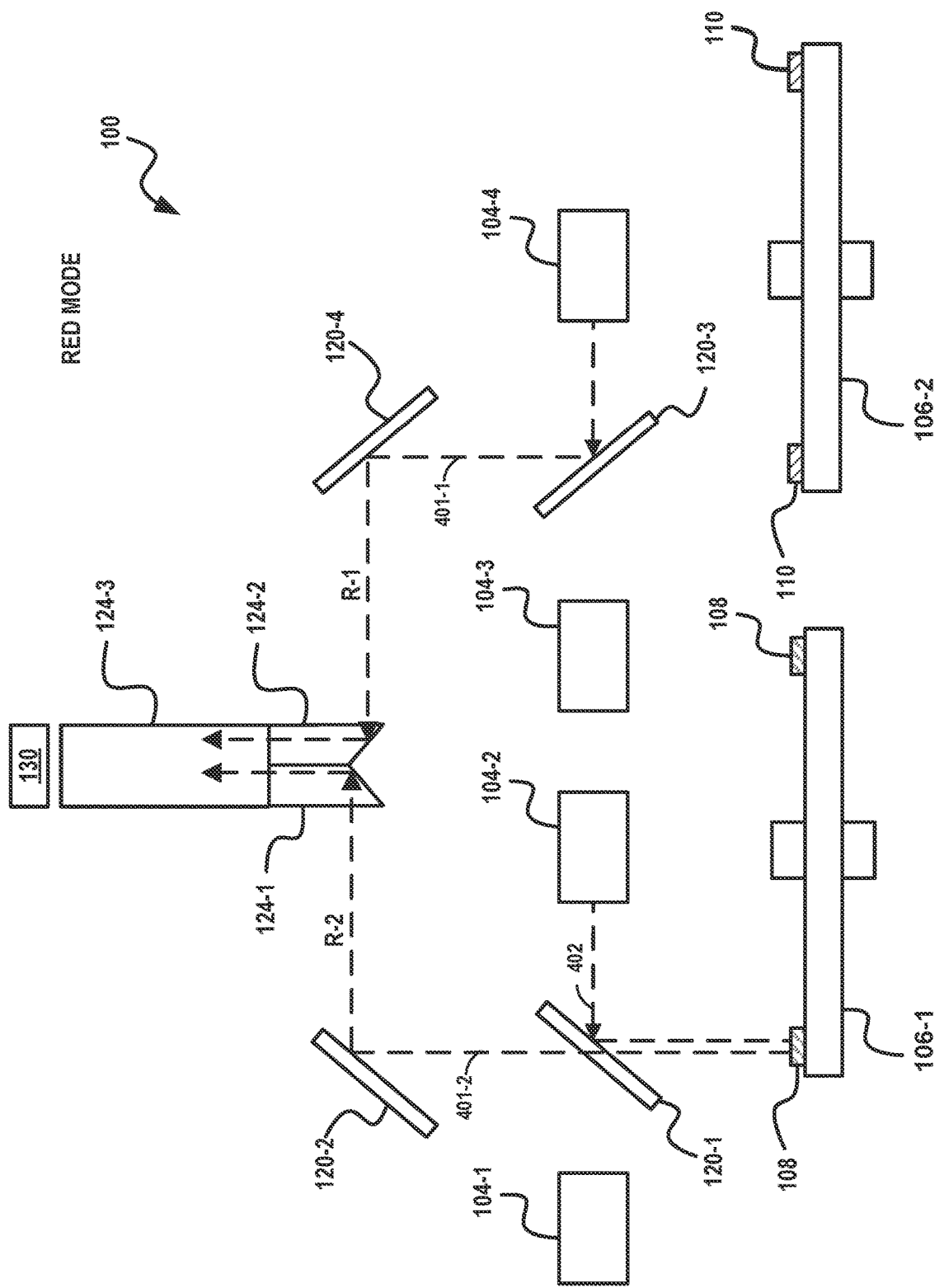
FIG. 4 depicts the dual phosphor wheel projection system of FIG. 1 in a red mode, according to non-limiting examples.
Figure 5:
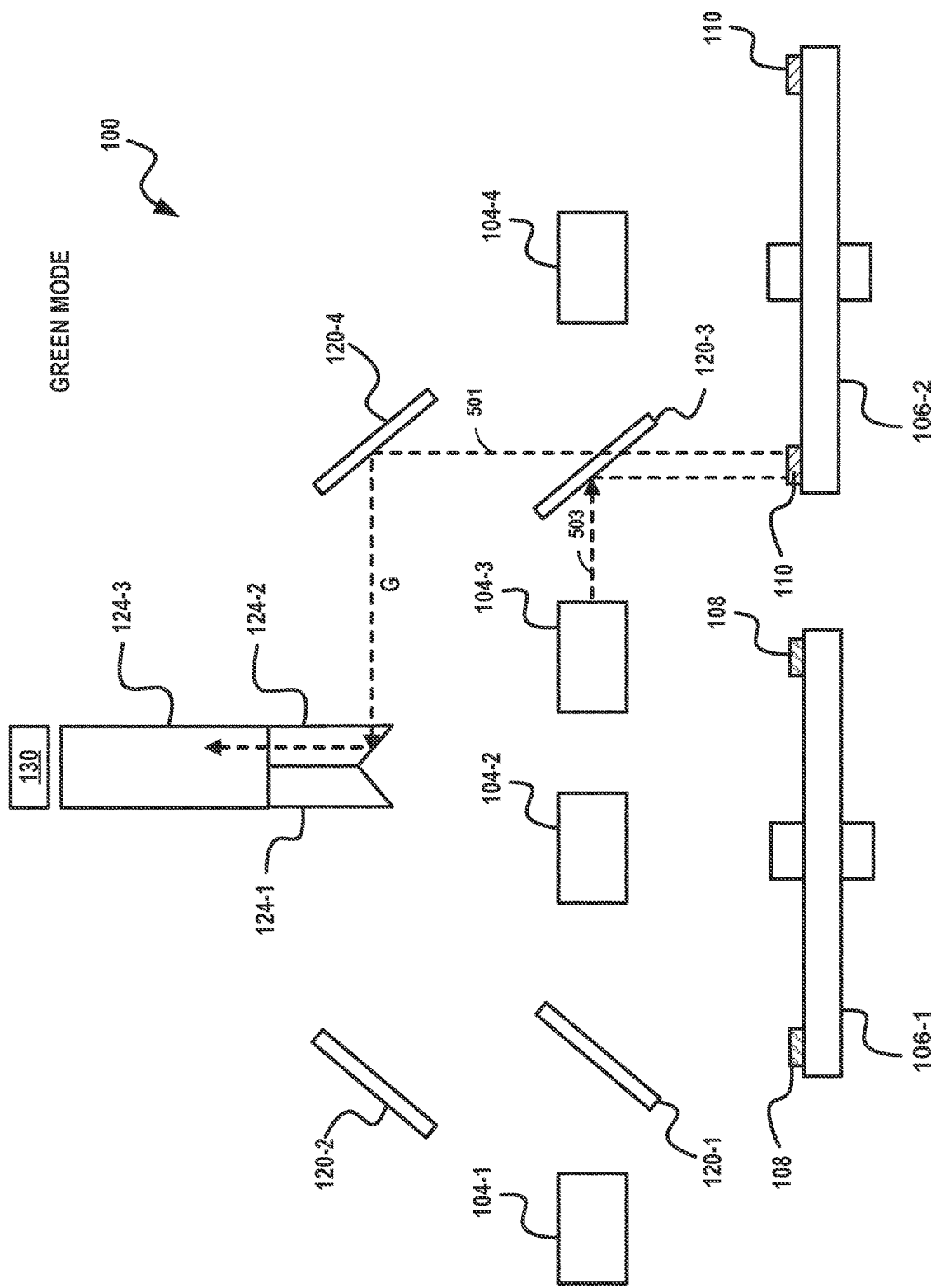
FIG. 5 depicts the dual phosphor wheel projection system of FIG. 1 in a green mode, according to non-limiting examples.

Attention is next directed to FIG. 3, FIG. 4, and FIG. 5, which are substantially similar to FIG. 1, with like components having like numbers. While the heat sinks 122 are not depicted for simplicity, one or more of the heat sinks 122 may nonetheless be present.

In particular, FIG. 3, FIG. 4 and FIG. 5 depict the system 100 being respectively operated in a blue mode and/or blue time period, a red mode and/or red time period, and a green mode and/or green time period. It is understood that the controller 132 may control the lasers 104 to be on or off depending on the mode and/or time period, and furthermore the controller 132 may control the SLM 130 to form a respective blue, red or green image in the blue mode and/or blue time period, the red mode and/or red time period, and the green mode and/or green time period. Hence, while not depicted, it is understood that that the controller 132 is in communication with components for turning the lasers 104 on and off, and furthermore the controller 132 is in communication with components for controlling the SLM 130. Alternatively, a component that controls an image of the SLM 130 may communicate with the controller 132 to indicate a mode and/or time period in which the system 100 should operate, with the controller 132 controlling the lasers 104 accordingly. Furthermore, while the various modes are described in an order of blue, red, green, the modes may occur in any suitable order.

Furthermore, in the following description, relative angles of components of the system 100 are described. However, such relative angles are understood to be merely examples and any other suitable relative angles are within the scope of the present specification.

With attention directed to FIG. 3, in the blue mode, the first laser 104-1 is on, and the other lasers 104 are off, and the first laser 104-1 generates first blue light 301 (also labelled "B"), and a wavelength of the first blue light 301 of the first blue laser 104-1 may be selected to meet a given color point of the system 100; in particular, as the first laser 104-1 is the primary source of blue light in the system 100, the wavelength of the first blue laser 104-1 may be selected to meet given color specifications that the system 100 is to meet. In a particular example, wavelength of the first blue light 301 of the first blue laser 104-1 may be about 465 nm, which may be different from a wavelength of the blue lasers 104-2, 104-3 of 455 nm, which are selected to excite the phosphors 108, 110. However, the first blue light 301 of the first blue laser 104-1 may be about of any suitable wavelength that corresponds to blue light (e.g., about 380 nm to about 500 nm).

As depicted, the first blue light 301 is emitted towards a side of the first dichroic mirror 120-1, which is understood to be at 45° to the first laser 104-1, angled towards the second dichroic mirror 120-2.

With brief reference to FIG. 9A, which depicts a transmission curve 902 of the first dichroic mirror 120-1, it is understood that the first dichroic mirror 120-1 transmits light above about 520 nm and reflects light below about 475 nm; between about 525 nm and about 475 nm, the first dichroic mirror 120-1 partially transmits and partially reflects light in region that may be referred to as a "transition region". Furthermore, a transmission wavelength cutoff is indicated (e.g. a wavelength of about 500 nm in the transition region where the transmission and reflection are each about 50%). The first dichroic mirror 120-1 is understood to comprise a band-pass filter that generally transmits light above the wavelength cutoff, and reflects light below the wavelength cutoff.

Similarly, with brief reference to FIG. 9B, which depicts a transmission curve 904 of the second dichroic mirror 120-2, it is understood that the second dichroic mirror 120-2 transmits light between about 525 nm and about 575 nm, and reflects light below about 475 nm and also reflects light above about 620 nm; in the regions between about 475 nm and about 525 nm, and between about 575 nm and about 620 nm, the second dichroic mirror 120-2 partially transmits and partially reflects light, which may also be referred to as transition regions. Furthermore, a transmission short wavelength cutoff and transmission long wavelength cutoff are indicated (e.g. a wavelength of about 500 nm in the lower wavelength transition region where the transmission and reflection are each about 50%, and a wavelength of about 585 nm in the higher wavelength transition region where the transmission and reflection are each about 50%). The second dichroic mirror 120-2 is understood to comprise a band-pass filter that generally transmits light between the short and long wavelength cutoffs, and reflects light above and below, respectively, the short and long wavelength cutoffs.

Figure 9A:
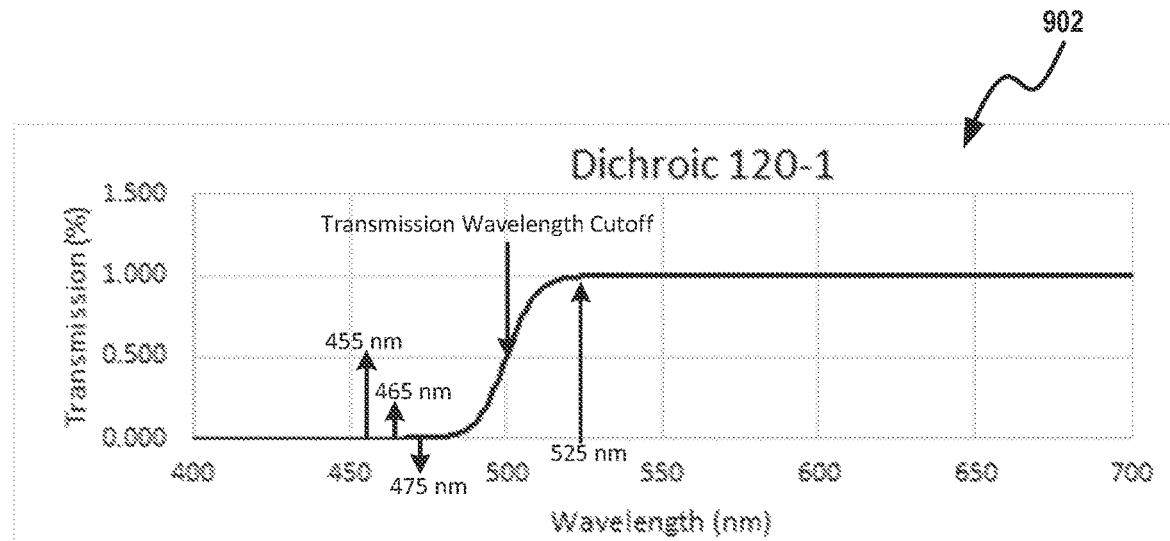
FIG. 9A depicts a transmission curve of a first dichroic mirror of the system of FIG. 1 or FIG. 2, according to non-limiting examples.
Figure 9B:
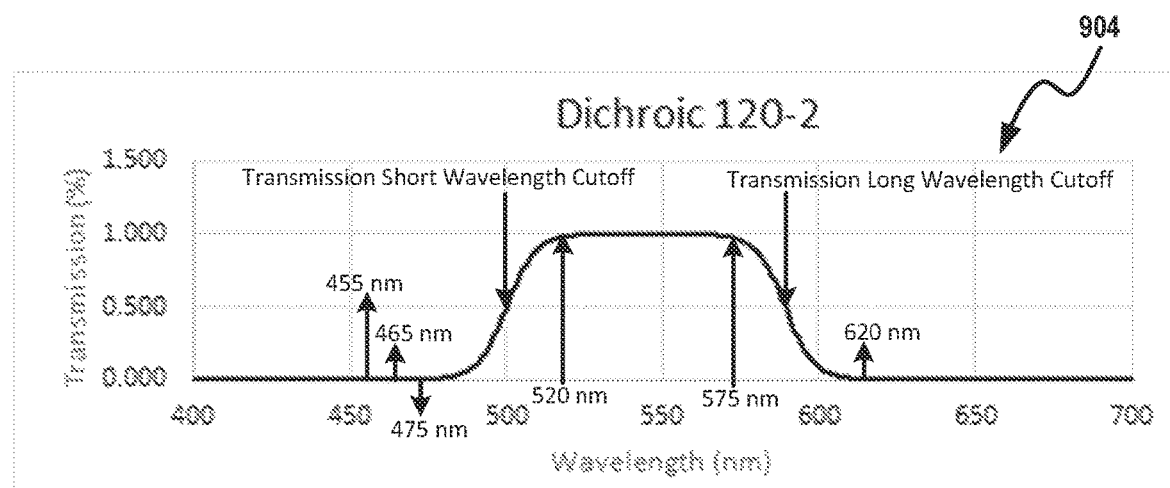
FIG. 9B depicts a transmission curve of a second dichroic mirror of the system of FIG. 1 or FIG. 2, according to non-limiting examples.

Returning to FIG. 3, as the wavelength of the first blue light 301 is 465 nm (e.g. in the reflection range of both dichroic mirrors 120-1, 120-2, with 465 nm also indicated in FIG. 9A and FIG. 9B), the first dichroic mirror 120-1 reflects the first blue light 301 towards the second dichroic mirror 120-2, which is at 45° to the first dichroic mirror 120-1 and about parallel to the fold mirror of the first integrator 124-1. As such, the first blue light 301 is directed and/or reflected from the second dichroic mirror 120-2 to the fold mirror of the first integrator 124-1, which reflects the first blue light 301 into the body of the first integrator 124-1. FIG. 3 further illustrates that the fold mirror of the first integrator 124-1 is arranged to reflect the first blue light 301 into the body of the first integrator 124-1 (e.g. the fold mirror the first integrator 124-1 is at about 45° to an output face of the first integrator 124-1). The first blue light 301 is hence integrated by the first integrator 124-1, and further integrated by the third integrator 124-3, and provided to the SLM 130 to form a blue image and/or blue sub-image (e.g. of an RGB image).

Put another way, the first dichroic mirror 124-1 is configured to direct the first blue light 301 from the first laser 104-1 to the second dichroic mirror 124-2, and the second dichroic mirror 124-2 is configured to direct the first blue light 301 from the first dichroic mirror 124-1 to the at least one light integrator 124.

With attention directed to FIG. 4, in the red mode, the second laser 104-2 and the fourth laser 104-4 are both on. With fourth laser 104-4 generates first red light 401-1 (also labelled R-1), and a wavelength of the first red light 401-1 of the red laser 104-4 may be selected to meet a given color point of the system 100; in particular, as the fourth laser 104-4 is one of two sources of red light in the system 100, that operate concurrently, the wavelength of the first red light 401-1 of the red laser 104-4 may be selected to meet given color specifications that the system 100 is to meet in combination with the second red light 401-2. In a particular example, wavelength of the first red light 401-1 of the red laser 104-4 may be about 638 nm. However, the first red light 401-1 of the red laser 104-4 may be of any suitable wavelength that corresponds to red light (e.g., about 620 nm to about 750 nm).

As depicted, the first red light 401-1 is emitted towards a side of the third dichroic mirror 120-3, which is understood to be at 45° to the fourth laser 104-4, angled towards the fourth dichroic mirror 120-4.

With brief reference to FIG. 10A, which depicts a transmission curve 1002 of the third dichroic mirror 120-3, it is understood that the third dichroic mirror 120-3 transmits light between about 500 nm and about 590 nm, and reflects light below about 475 nm and also reflects light above about 620 nm; in the regions between about 475 nm and about 500 nm, and between about 590 nm and about 620 nm, the third dichroic mirror 120-3 partially transmits and partially reflects light (e.g. transition regions). Furthermore, a transmission short wavelength cutoff and transmission long wavelength cutoff are indicated (e.g. a wavelength of about 485 nm in the lower wavelength transition region where the transmission and reflection are each about 50%, and a wavelength of about 610 nm in the higher wavelength transition region where the transmission and reflection are each about 50%). The third dichroic mirror 120-3 is understood to comprise a band-pass filter that generally transmits light between the short and long wavelength cutoffs, and reflects light above and below, respectively, the short and long wavelength cutoffs.

Similarly, with brief reference to FIG. 10B, which depicts a transmission curve 1004 of the fourth dichroic mirror 120-4, it is understood that the fourth dichroic mirror 120-4 transmits light between about 590 nm and about 610 nm, and reflects light below about 560 nm and also reflects light above about 635 nm; in the regions between about 560 nm and about 590 nm, and between about 610 nm and about 635 nm, the fourth dichroic mirror 120-4 partially transmits and partially reflects light (e.g. transition regions). Furthermore, a transmission short wavelength cutoff and transmission long wavelength cutoff are indicated (e.g. a wavelength of about 580 nm in the lower wavelength transition region where the transmission and reflection are each about 50%, and a wavelength of about 615 nm in the higher wavelength transition region where the transmission and reflection are each about 50%). The fourth dichroic mirror 120-3 is understood to comprise a yellow notch filter (e.g. a type of band pass filter) that generally transmits yellow light between the short and long wavelength cutoffs, and reflects light above and below, respectively, the short and long wavelength cutoffs.

While specific transmission curves of the dichroic mirrors 120 are described herein, it is understood that the transmission curves of the dichroic mirrors 120 may be adapted according to wavelengths of light emitted by the first blue laser 104-1, the red laser 104-1, or by the phosphors 108, 110.

Figure 10A:
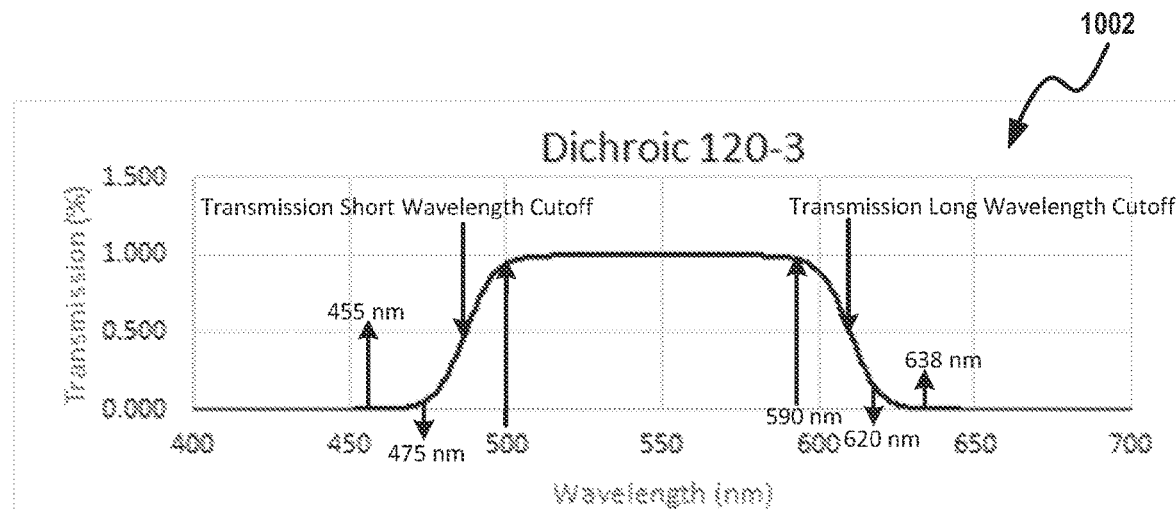
FIG. 10A depicts a transmission curve of a third dichroic mirror of the system of FIG. 1 or FIG. 2, according to non-limiting examples.
Figure 10B:
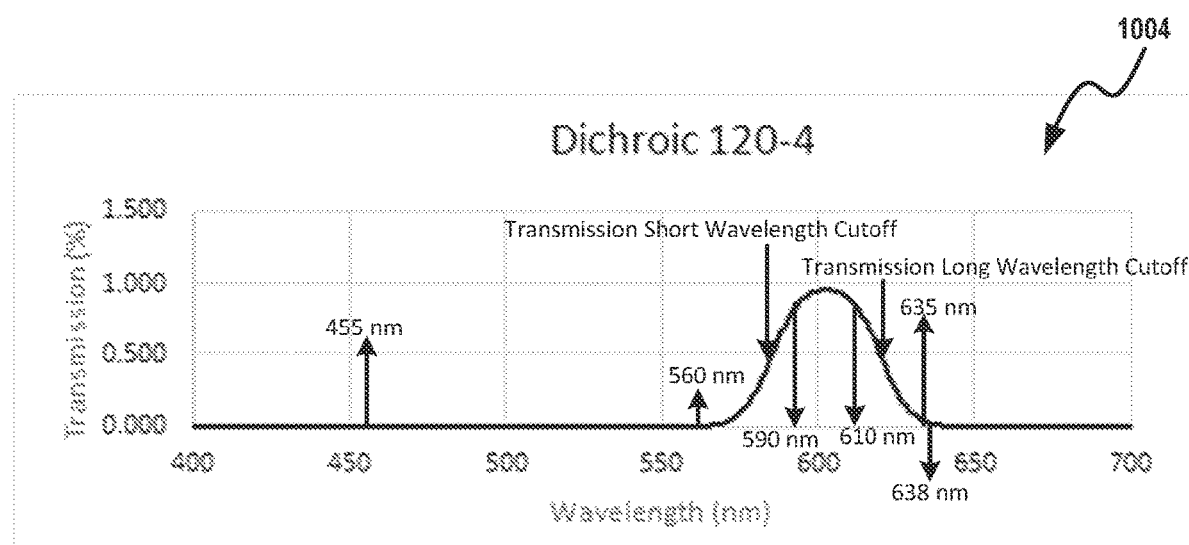
FIG. 10B depicts a transmission curve of a fourth dichroic mirror of the system of FIG. 2, according to non-limiting examples.

Returning to FIG. 4, as the wavelength of the first red light 401-1 is 638 nm (e.g. in the reflection range of both dichroic mirrors 120-3, 120-4 as also indicated in FIG. 10A and FIG. 10B), the third dichroic mirror 120-3 reflects the first red light 401-1 towards a side of the fourth dichroic mirror 120-4, which is at 45° to the third dichroic mirror 120-3 and about parallel to the fold mirror of the second integrator 124-2 (e.g. the fold mirror the second integrator 124-2 is at about 45° to an output face of the second integrator 124-2).

As such, the first red light 401-1 is directed and/or reflected from the fourth dichroic mirror 120-4 to the fold mirror of the second integrator 124-2, which reflects the first red light 401-1 into the body of the second integrator 124-2. FIG. 4 further illustrates that the fold mirror of the second integrator 124-2 is arranged to reflect the first red light 401-1 into the body of the second integrator 124-2. The first red light 401-1 is hence integrated by the second integrator 124-2 and further integrated by the third integrator 124-3, and provided to the SLM 130 to form a red image and/or red sub-image (e.g. of the RGB image).

However, with attention further directed to FIG. 4, in the red mode, the second laser 104-2 is also on and generates second blue light 402 (e.g. also labelled "R-2"), and a wavelength of the second blue light 402 of the second blue laser 104-2 may be selected to selected to excite the phosphor 108, as previously described. For example, a wavelength of the second blue light 402 of the second blue laser 104-2 may be 455 nm.

As depicted, the second blue light 402 is emitted towards a side of the first dichroic mirror 120-2, which is understood to be at 45° to the second laser 104-2, angled towards the first phosphor wheel 106-1. Hence it is understood that the lasers 104-1, 104-2 are on opposite sides of the first dichroic mirror 120-1 and hence respective blue light 301, 402 from the lasers 104-1, 104-2 are directed/reflected in opposite directions.

As the wavelength of the second blue light 402 is 455 nm (e.g. in the reflection range of the first dichroic mirror 120-1, as also indicated in FIG. 9A), the first dichroic mirror 120-1 reflects the second blue light 402 towards the first phosphor wheel 106-1, and specifically towards the phosphor 108, which is excited and emits second red light 401-2 (e.g. as depicted in FIG. 8) as well as other colors in a respective phosphor spectrum 800.

The second red light 401-2, and other colors, are emitted towards the first dichroic mirror 120-1. Comparing a phosphor spectra 800 of the phosphor 108 of FIG. 8 with the transmission curve 902 of the first dichroic mirror 120-1 of FIG. 9A, it is understood that the wavelengths of the light emitted by the phosphor 110 that are above about 525 nm (e.g. green to red) are transmitted through the first dichroic mirror 120-1 towards the second dichroic mirror 120-2, while other wavelengths (e.g. blue) are reflected or partially reflected.

Comparing the phosphor spectra 800 of the phosphor 108 of FIG. 8 with the transmission curve 904 of the second dichroic mirror 120-2 of FIG. 9B, it is understood that the wavelengths of the light that are transmitted through the first dichroic mirror 120-1 towards the second dichroic mirror 120-2, that are above about 620 nm (e.g. the second red light 401-2) are reflected towards the fold mirror of the first integrator 124-1, and that light below about 620 nm is transmitted (or partially transmitted) through the second dichroic mirror 120-2 (e.g. green to orange).

Indeed, it is understood that a multiplication of a phosphor spectra 800 of the phosphor 108, by transmission curve of the first dichroic mirror 120-1, and by the reflectance curve of the second dichroic mirror 120-2 (e.g. 1 minus the transmission curve 904 of FIG. 9B), generally yield the spectra of the second red light 401-2 that enters the first integrator 124-1. As such, the dichroic mirrors 120-1, 120-2, and more specifically the second dichroic mirror 120-2, generally acts as a filter to select and/or filter the second red light 401-2 from the other colors of light emitted by the first phosphor 108. Put another way, one or more of the first dichroic mirror 120-1 and the second dichroic mirror 120-2 may be further configured to refine the second red light 401-2 to shift a peak wavelength thereof (e.g. a dominant wavelength that results from the filtering).

Similar to the first blue light 301, the second red light 401-2 is directed and/or reflected from the second dichroic mirror 120-2 to the fold mirror of the first integrator 124-1, which reflects the second red light 401-2 into the body of the first integrator 124-2. Hence, the second dichroic mirror 120-2 both directs the second red light 401-2 to the first integrator 124-1 and filters the second red light 401-2. Furthermore, the second red light 401-2 is integrated by the first integrator 124-1 and the third integrator 124-3, and the third integrator 124-3 further combines and integrates the first red light 401-1 and the second red light 401-2 and provides the combined red light 401 to the SLM 130 to form the red image and/or the red sub-image (e.g. of the RGB image).

Indeed, again with reference to FIG. 9B, a sharpness and/or position of the transition region of the second dichroic mirror 120-2 between 575 nm and 620 nm may be selected to more precisely select and/or filter the second red light 401-2, for example to be around the 638 nm of the first red light 401-1. For example, by making the transition region of the second dichroic mirror 120-2 "sharper", such as by narrowing the transition region to about 615 nm to about 620 nm, more green, yellow, and orange light may be filtered from the second red light 401-2 to shift a color point of the second red light 401-2 towards 638 nm, though this may also have an effect of decreasing brightness of the second red light 401-2. Alternatively, and/or in addition, by shifting the transition region from 575 nm and 620 nm to 580 nm to 625 nm (e.g. same width, but higher in wavelength), more green, yellow, and orange light may be filtered from the second red light 401-2 to shift a color point of the second red light 401-2 towards 638 nm, though this may also have an effect of decreasing brightness of the second red light 401-2. It is understood that such sharpening and/or shifting of the transition region of the second dichroic mirror 120-2 (or any of the dichroic mirrors 120), occurs during manufacture of the second dichroic mirror 120-2, (or during manufacture of any of the dichroic mirrors 120).

Regardless, it is understood that, as the first red light 401-1 and the second red light 401-2 are combined, both the lasers 104-2, 104-4 may have lower power requirements than when only one of the 104-2, 104-4 were used to generate red light in the system 100. Furthermore, use of both the lasers 104-2, 104-4 enables the second laser 104-2 to be operated at a power that is below a quenching limit of the first phosphor 108.

A color of the red light that exits the third integrator 124-3 is understood to be a combination of the color of the first red light 401-1 and the second red light 401-2, and which may be tuned by selecting a sharpness and/or position of the transition region of the second dichroic mirror 120-2 between 575 nm and 625 nm, though such selecting may affect the brightness of the second red light 401-2 when the transition region is shifted towards higher wavelengths. However, it is understood that transition region may be from wavelengths shorter than 575 nm and/or to wavelengths longer than 625 nm, and may depend on a given brightness and/or a given red color (e.g. red color point) and/or a given white point (e.g. color of white light that results from the combination of the red, green and blue light generated by the system 100).

From at least the description of FIG. 4, it is understood that the first dichroic mirror 120-1 is further configured to direct the second blue light 402 from the second laser 104-2 to the first phosphor 108, arranged on the first phosphor wheel 106-1, the first phosphor 108 configured to convert the second blue light 402 to longer wavelengths that includes the second red light 401-2, and the second dichroic mirror 120-2 is further configured to direct the second red light 401-2 to the at least one light integrator 124 and transmit (or partially transmit) others of the longer wavelengths, and the at least one light integrator 124 combines the first red light 401-1 and the second red light 401-2. It is further understood that the third dichroic mirror 120-3 is configured to: direct the first red light 401-1 from the fourth laser 104-4 to the at least one light integrator 124.

With attention directed to FIG. 5, in the green mode, the third laser 104-3 is on, and the other lasers 104 are off. The third laser 104-3 generates third blue light 503, and a wavelength of the third blue light 503 of the third blue laser 104-3 may be selected to selected to excite the phosphor 110, as previously described. For example, the wavelength of the third blue light 503 may be about 455 nm.

As depicted, the third blue light 503 is emitted towards a side of the third dichroic mirror 120-3, which is understood to be at 45° to the third laser 104-3, angled towards the second phosphor wheel 106-2. Hence it is understood that the lasers 104-3, 104-4 are on opposite sides of the third dichroic mirror 120-3 and hence blue light 503 from the laser 104-3, and red light 401-1 from the laser 104-4 are directed/reflected in opposite directions.

As the wavelength of the third blue light 503 is 455 nm (e.g. in the reflection range of the third dichroic mirror 120-3 as also indicated in FIG. 10A), the third dichroic mirror 120-3 reflects the third blue light 503 towards the second phosphor wheel 106-2, and specifically towards the phosphor 110, which is excited and emits green light 501 (e.g. as depicted in FIG. 8) as well as other colors in a respective phosphor spectrum 800.

The green light 501, and other colors, are emitted towards the third dichroic mirror 120-3. Comparing a phosphor spectra 800 of the phosphor 110 of FIG. 8 with the transmission curve 1002 of the third dichroic mirror 120-3 of FIG. 10A, it is understood that the wavelengths of the light emitted by the phosphor 110 that are between about 500 nm and about 590 nm (e.g. green to orange) are transmitted through the third dichroic mirror 120-3 towards the fourth dichroic mirror 120-4, while other wavelengths (e.g. blue and red) are reflected or partially reflected.

Comparing the phosphor spectra 800 of the phosphor 110 of FIG. 8 with the transmission curve 1004 of the fourth dichroic mirror 120-4 of FIG. 10B, it is understood that the wavelengths of the light that are transmitted through the third dichroic mirror 120-3 towards the fourth dichroic mirror 120-4, that are below about 560 nm (e.g. the green light 501) or above 635 nm (e.g. the first red light 401-1) are reflected towards the fold mirror of the second integrator 124-2, while other wavelengths (e.g. yellow to orange) are transmitted and/or partially transmitted. While red light emitted by the phosphor 110 (e.g. above about 620 nm) in the green mode may also be reflected, FIG. 8 shows that the phosphor 110 is generally red deficient and hence red light won't significantly contribute to the color point of the green light 501. Hence, it is understood that the transmission curve 1004 of the fourth dichroic mirror 120-4 is selected to reflect the red light 401, as well as filter the green light 501 from other colors emitted by the phosphor 110.

Indeed, it is understood that a multiplication of a phosphor spectra 800 of the phosphor 110, by the transmission curve of the third dichroic mirror 120-3, and by the reflectance curve of the fourth dichroic mirror 120-4 (e.g. 1 minus the transmission curve 1004 of FIG. 10B), generally yield the spectra of the green light 501 that enters the second integrator 124-2. As such, the dichroic mirrors 120-3, 120-4, and more specifically the fourth dichroic mirror 120-4, generally acts as a filter to select and/or filter the green light 501 from the other colors of light emitted by the second phosphor 110. Put another way, one or more of the third dichroic mirror 120-3 and the fourth dichroic mirror 120-4 may be further configured to refine the green light 501 to shift a peak wavelength thereof (e.g. a dominant wavelength that results from the filtering).

Similar to the red light 401, the green light 501 is directed and/or reflected from the fourth dichroic mirror 120-4 to the fold mirror of the second integrator 124-2, which reflects the green light 501 into the body of the second integrator 124-2. Hence, the fourth dichroic mirror 120-4 both directs the green light 501 to the second integrator 124-2 and filters the green light 501. Furthermore, the green light 501 is hence integrated by the second integrator 124-2 and further integrated by the third integrator 124-3, which provides the green light 501 provided to the SLM 130 to form the green image and/or the green sub-image (e.g. of the RGB image).

Indeed, again with reference to FIG. 10B, a sharpness and/or position of the transition region of the fourth dichroic mirror 120-4 between about 560 nm and about 610 nm may be selected to more precisely select and/or filter the green light 501, for example to a given color point.

For example, again with reference to FIG. 10B, a sharpness and/or position of the transition region of the fourth dichroic mirror 120-4 between about 560 nm and about 610 nm may be selected to more precisely select and/or filter the green light 501. For example, by making the transition region of the fourth dichroic mirror 120-4 "sharper", such as by narrowing the transition region to about 560 nm to about 575 nm, more yellow and orange light may be filtered from the green light 501 to shift a color point of the green light 501 to a deeper green, though this may also have an effect of decreasing brightness of the green light 501. Alternatively, and/or in addition, by shifting the transition region from 560 nm and 610 nm, to 550 nm to 600 nm (e.g. same width, but higher in wavelength), more yellow, and orange light may be filtered from the green light 501 to shift a color point of the green light 501 to a deeper green, though this may also have an effect of decreasing brightness of the green light 501. It is understood that such sharpening and/or shifting of the transition region of the fourth dichroic mirror 120-4 (or any of the dichroic mirrors 120), occurs during manufacture of the fourth dichroic mirror 120-4, (or during manufacture of any of the dichroic mirrors 120).

It is further understood that the third dichroic mirror 120-3 may also be adapted for such filtering, for example by narrowing the transmission region of the third dichroic mirror 120-3 to reflect yellow light and orange light, however the transmission curve of the dichroic mirror 120-3 may be constrained at least by having to maintain reflection of the third blue light 503 and reflection of the first red light 401-1. Hence, for example, the dichroic mirror 120-3 should reflect the third red light 503 and the first red light 401-1, as described herein, though the transmission short cutoff wavelength may be increased and/or the transmission long cutoff wavelength may be decreased to achieve "purer" greens.

It is further understood that the third dichroic mirror 120-3 is configured to: direct the first red light 401-1 from the fourth laser 104-4 to the at least one light integrator 124 (e.g. via the fourth dichroic mirror 120-4); and direct the third blue light 503 from the third laser 104-3 to the second phosphor 110, arranged on the second phosphor wheel 106-2.

It is further understood that the second phosphor 110 is configured to convert the third blue light 503 to respective longer wavelengths that includes the green light 501, and the third dichroic mirror 120-3 is further configured to transmit the green light 501 to the at least one light integrator 124 (e.g. via the fourth dichroic mirror 120-4).

While it is understood that the fourth dichroic mirror 120-4 is optional, it is understood that when the fourth dichroic mirror 120-4 is present, the third dichroic mirror 120-3 is configured to direct the first red light 401-1 from the fourth laser 104-3 to the at least one light integrator 124 via the fourth dichroic mirror 120-4, and the fourth dichroic mirror 120-4 is configured to direct the first red light 401-1 from the third dichroic mirror 120-3 to the at least one light integrator 124. It is furthermore understood that that when the fourth dichroic mirror 120-4 is present the third dichroic mirror 120-3 is further configured to transmit the green light 501 to the at least one light integrator 124 via the fourth dichroic mirror 120-4, the fourth dichroic mirror 120-4 is further configured to direct the green light 501 to the at least one light integrator 124 and transmit and/or partially transmit, others of the respective longer wavelengths that are emitted by the phosphor 110.

Figure 6:
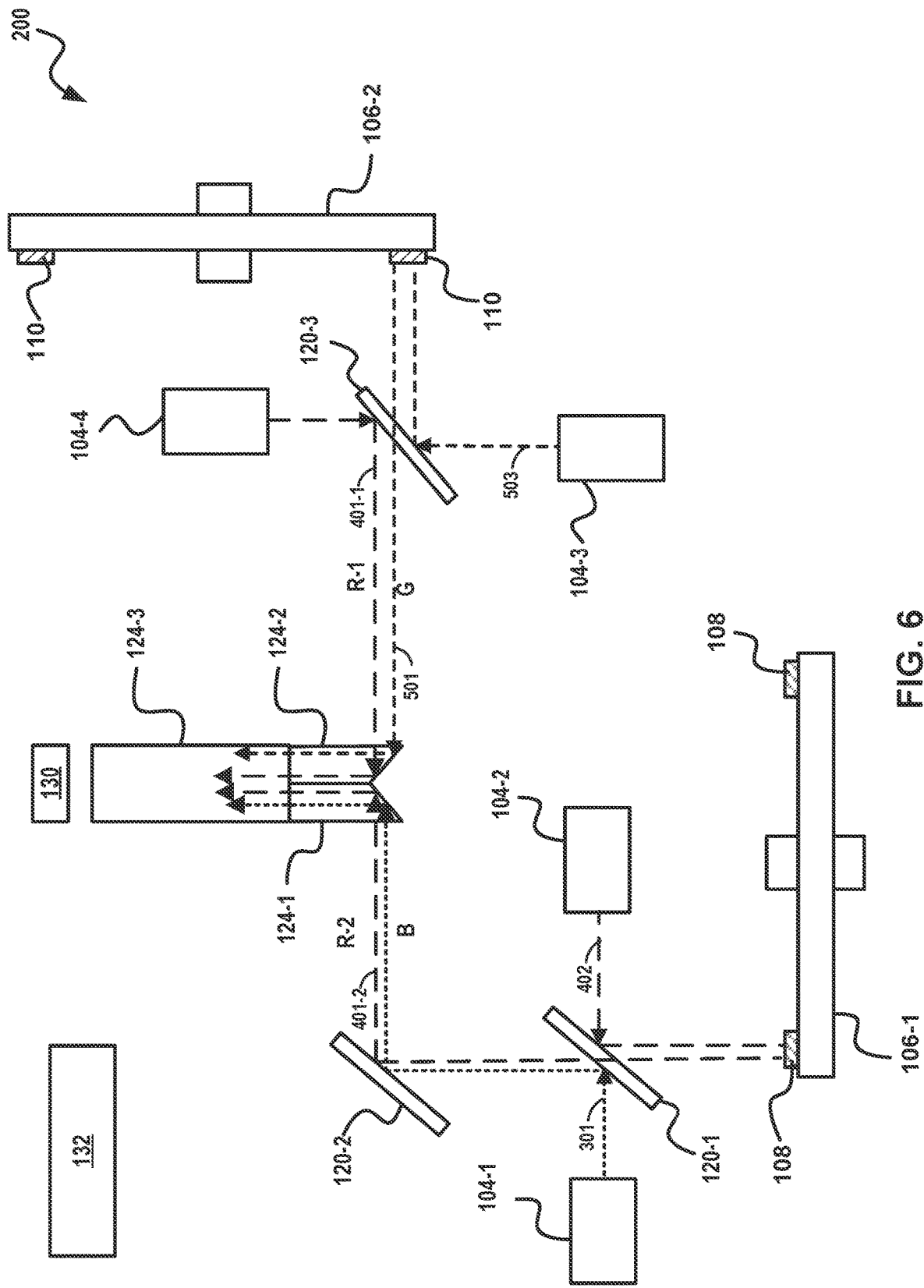
FIG. 6 depicts the dual phosphor wheel projection system of FIG. showing a blue mode, a red mode and a green mode simultaneously, according to non-limiting examples.

Attention is next directed to FIG. 6 which depicts the system 200 with all four lasers 104 in operation. FIG. 6 is provided to for simplicity to show similarities and differences between the systems 100, 200 in operation. Hence, while all four lasers 104 are in operation in FIG. 6, it is understood that the system 100 may be operated in a blue mode, a red mode and a green mode, similar to as respectively depicted in FIG. 3, FIG. 4, and FIG. 5, with the first laser 104-1 being on the blue mode and the other lasers 104 being off, the second laser 104-2 and the third lasers 104-3 being on in the red mode and the other lasers 104 being off, and the fourth laser 104-4 being on in the green mode with the other lasers 104 being off.

As depicted, in the system 200, the paths of the first blue light 301, the second blue light 402 and the second red light 401-2 are similar to, and/or the same as, the paths of the first blue light 301, the second blue light 402 and the second red light 401-2 in the system 100.

However, as the lasers 104-3, 104-4, the second phosphor wheel 106-2, and the third dichroic mirror 120-3 are rotated 90° relative to the integrator 124-2, as compared to the system 100, the first red light 401-1 is directed and/or reflected from the third dichroic mirror 120-3 into the second integrator 124-2, and similarly the green light 501 is transmitted through the third dichroic mirror 120-3 into the second integrator 124-2. Hence, if the third dichroic mirror 120-3 of the system 100 has the same transmission curve 1002 as in the system 100 (e.g. as depicted in FIG. 10A), less filtering of the green light 501 may occur, though the transmission curve 1002 of the third dichroic mirror 120-3 of the system 100 may tuned to better filter the green light 501, as described above.

Summarizing the at least one light integrator 124, it is understood that in the depicted examples, the at least one light integrator 124 comprises: a first light integrator 124-1 configured to receive the first blue light 301 and the second red light 401-2 from the second dichroic mirror 124-2; a second light integrator 124-2 configured to receive the green light 5-1 and the first red light 401-2 from the third dichroic mirror 120-3 (e.g. directly as in the system 200, or via the fourth dichroic mirror 120-4 in the system 100); and a third light integrator 124-3 to combine respective light from the first light integrator 124-1 and the second light integrator 124-2. Furthermore, the at least one light integrator 124 is arranged to provide light received at the at least one light integrator 124 to a spatial light modulator 130. Furthermore, while the integrators 124 are depicted as three separate components, the integrators 124 may be provided as one integrator 124 (or two or more integrators 124), and the like, having the same shape and/or configuration and/or functionality as the three depicted integrators 124.

Figure 11:
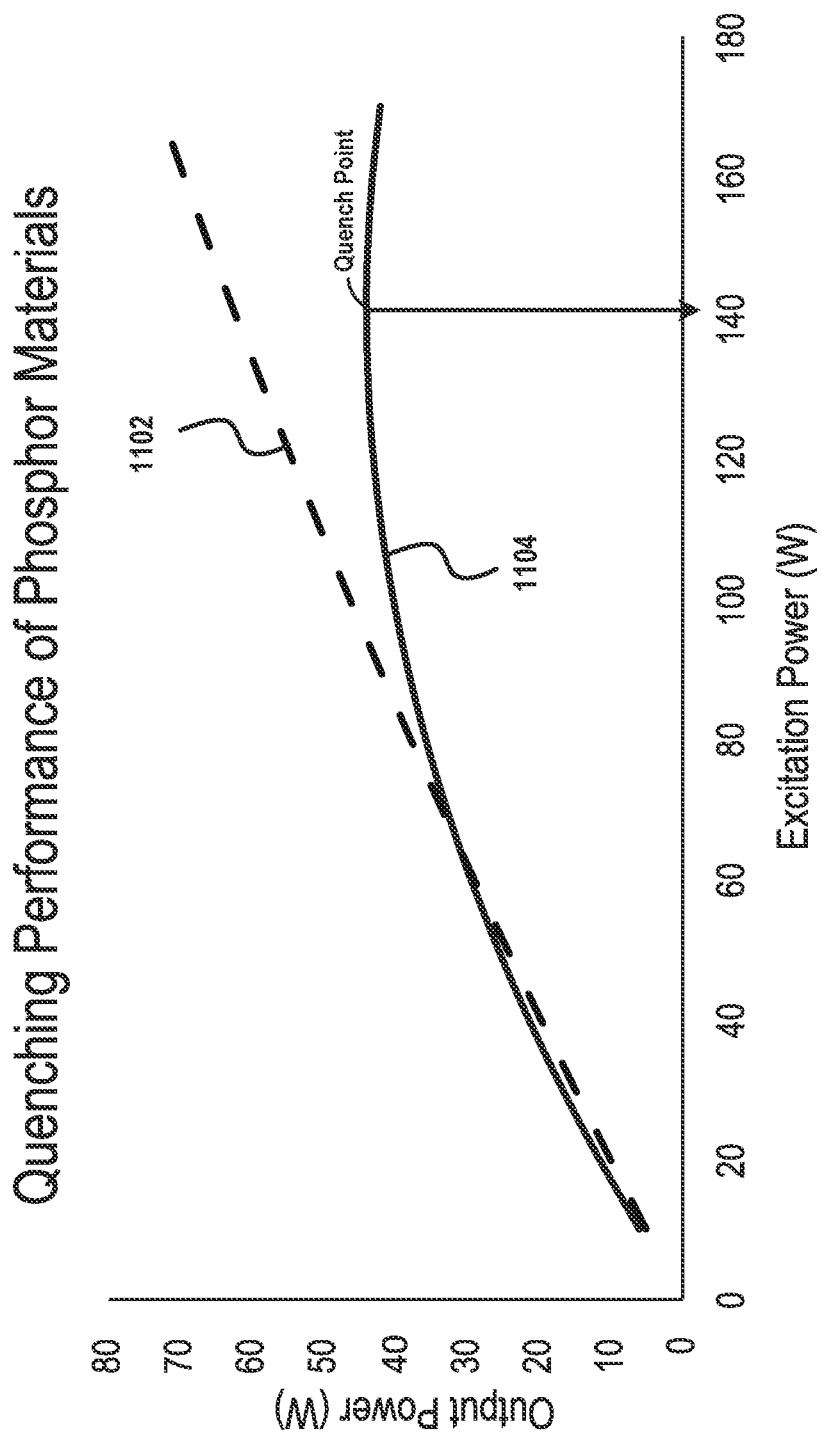
FIG. 11 depicts quenching curves for two different candidate phosphors that may be used in the system of FIG. 1 or FIG. 2, according to non-limiting examples.

Attention is next FIG. 11 which depicts quenching curves 1102, 1104 for two different candidate phosphors that may be used in the system 100 (and/or the system 200). In particular, the quenching curves 1102, 1104 show output power (in Watts) of two different phosphors as a function of excitation power (in Watts). At excitation powers below about 80 W (e.g. 80 W of power ae being input to the two phosphorus by a laser), phosphor conversion efficiency will be typically between 50 and 60% (e.g. between 10 W and 80 W excitation power, the output powers are about 50 to 60% of the excitation power). The remaining excitation power is converted to waste heat, causing a temperature of a phosphor to rise. As a temperature of a phosphor increases its conversion efficiency decreases; put another way, as excitation power is increased, the efficiency of a phosphor is reduced and eventually a quench point may be reached in which output power decreases with excitation power. While the phosphor having the quenching curve 1102 does not have a quench point, the phosphor having the quenching curve 1104 has a quench point at about 140 W excitation power. Presuming that the phosphors 108 110 have respective quench curves similar to the quenching curve 1104, it is preferable to operate the lasers 104-2, 104-3 at an excitation power that is below a quench point of the phosphor 110 to maximize efficiency. This problem may be exacerbated when one phosphor wheel is used (e.g. in the prior art) that includes different phosphors (e.g. emitting different colors) having different quench points, as a laser would have to be operated at an excitation power that is below the smallest of the quench points. Hence, splitting thermal load of the system across the two phosphor wheels 106 provides flexibility as the lasers 104-2, 104-3 according to respective quench points of the phosphors 108, 110. Furthermore, use of the first red light 401-1 of the red laser 104-4 to supplement the second red light 401-2 produced by the phosphor 108 may enable the second laser 104-2 to be operated at a lower relative power that is below a quench point, for example as compared to when the red laser 104-4 is not used. Put another way, wherein the first red light 401-1 and the second red light 401-2 supplement each other and/or form a combined red color from the combination of the first red light 401-1 and the second red light 401-2 and/or supplement each other's respective brightness.

Hence, it is generally understood that the second laser 104-2 is operated at a power that is below a quenching limit of the first phosphor 108, and the third laser 104-3 is operated at a respective power that is below a respective quenching limit of the second phosphor 110.

Figure 12:
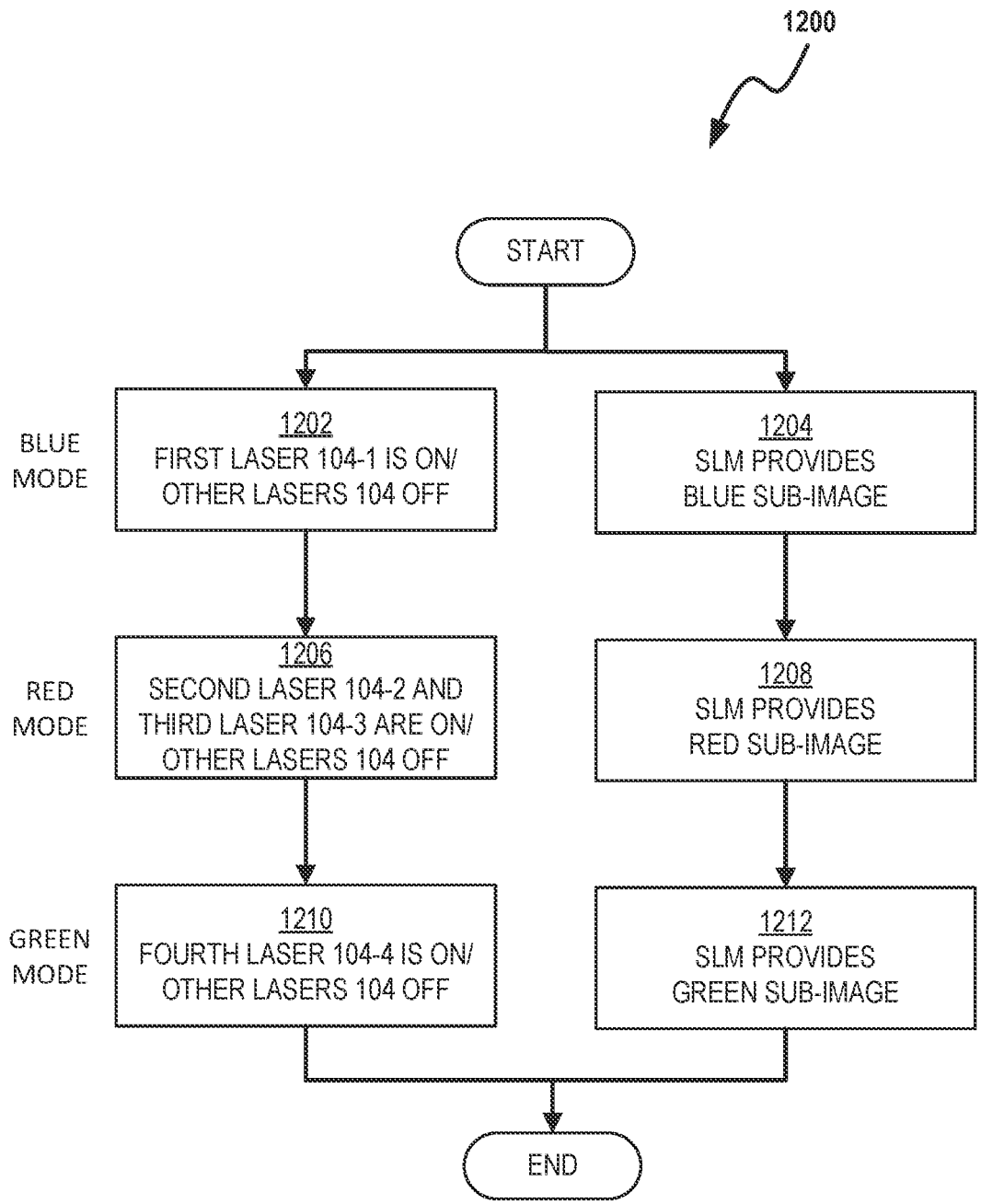
FIG. 12 depicts a flowchart of a method for controlling the system of FIG. 1 or FIG. 2, according to non-limiting examples.

Attention is next directed to FIG. 12, which depicts a method 1200 of controlling the system 100 (or the system 200). The operations of the method 1200 may correspond to machine readable instructions that are executed by the controller 132. The method 1200 of need not be performed in the exact sequence as shown and likewise various blocks may be performed in parallel rather than in sequence. Accordingly, the elements of method 1200 are referred to herein as "blocks" rather than "steps." The method 1200 may be implemented on variations of the system 100, as well (including, but not limited to, the system 200).

The method 1200 starts (e.g. at "START") and the controller 132 implements the blue mode by turning on the first blue laser 104-1 at a block 1202, while the other lasers 104 are controlled to be off; the SLM 130 is, in parallel, controlled to provide a blue sub-image at the block 1204. The SLM 130 may be controlled by the controller 132 at the block 1204 and/or the controller 132 may implement the block 1202 by receiving a command from another controller that is controlling the SLM 130, at the block 1204, to provide the blue sub-image. In general, the block 1202 is illustrated by FIG. 3 in which the first blue light 301 illuminates the SLM 130.

In the red mode, which as depicted follows the blue mode, the controller 132 turns on the second blue laser 104-2 and the third blue laser 104-3 at a block 1206, while the other lasers 104 are controlled to be off; the SLM 130 is, in parallel, controlled to provide a red sub-image at the block 1208. The SLM 130 may be controlled by the controller 132 at the block 1208 and/or the controller 132 may implement the block 1206 by receiving a command from another controller that is controlling the SLM 130, at the block 1208, to provide the red sub-image. In general, the block 1206 is illustrated by FIG. 4 in which the red light 401 illuminates the SLM 130.

In the green mode, which as depicted follows the red mode, the controller 132 turns on the fourth blue laser 104-2 at a block 1210, while the other lasers 104 are controlled to be off; the SLM 130 is, in parallel, controlled to provide a green sub-image at the block 1212. The SLM 130 may be controlled by the controller 132 at the block 1210 and/or the controller 132 may implement the block 1210 by receiving a command from another controller that is controlling the SLM 130, at the block 1212, to provide the green sub-image. In general, the block 1210 is illustrated by FIG. 4 in which the green light 501 illuminates the SLM 130.

Hence, in general, the controller 132 is configured to: during a blue time period, control the first laser 104-1 to emit the first blue light 301; during a red time period, control the second laser 104-2 to emit the second blue light 402 and control the fourth laser 104-3 to emit the first red light 401-2; and during a green time period, control the third laser 104-3 to emit the third blue light 503.

While the method 1200 is described with respect to the blue mode, the red mode and the green mode being implemented in a specific sequence, the modes may be implemented in any suitable sequence.

Furthermore the modes may be implemented for any suitable respective time periods, for example to achieve a given white point in the system 100 or the system 200 (e.g. a color of light achieved by combing the blue light 301, the red light 401 and the green light 501).

Furthermore the turning on given lasers 104 in a given mode and controlling the SLM 130 to provide a respective sub-image need happen in exact coordination. For example, respective lasers 104 may be turned on, and other lasers 104 may be turned off, in a given mode before the SLM 130 is controlled to provide a given sub-image, or respective lasers 104 may be turned on, and other lasers 104 may be turned off, in a given mode after the SLM 130 is controlled to provide a given sub-image. However, the SLM 130 is generally controlled to provide a given sub-image for a given mode only when lasers 104 of another mode are off (e.g. for the red mode, the SLM 130 is controlled to provide the red sub-image after the first blue laser 104-1 is off, but the SLM 130 may be controlled to provide the red sub-image before or after the lasers 104-2, 104-3 are on; similarly, the SLM 130 is controlled to stop providing the red sub-image before the fourth blue laser 104-4 is on).

Hence, red, green, and blue periods of light may be allocated according to a light budget, for example by turning the lasers 104 on and off. An efficiency of each color channel (e.g. a red color channel provided the red mode, a green color channel provided the green mode, and a blue color channel provided the blue mode) may vary, as will the amount of source laser light, which may result in a different brightness for a given color relative to the other colors. Video systems in general operate according to a balance of red, green, and blue light that when summed results in a specific white point. The relative duty cycles of red, green, and blue light may hence be chosen based on the amount of each color available in the specific implementation.

According to the present specification, during the time periods allocated to red, two sets of lasers 104-2, 104-3 are active and/or on in the system 100 (or the system 200) as depicted in FIG. 4. Blue light from the second laser 104-2, of wavelength 455 nm, is generally directed to the first dichroic mirror 120-1, with the wavelength 455 nm being in a reflection portion of the transmission curve 902 of the first dichroic mirror 120-1 (e.g. below the transmission wavelength cutoff). Hence, light from the from the second laser 104-2 is directed to the "red" phosphor 108 at the first phosphor wheel 106-1. The phosphor 108 generally fluoresces emitting yellow to red light (e.g. see FIG. 8) which is directed back towards the first dichroic mirror 120-1. The yellow to red light is in a transmission portion of the transmission curve 902 of the first dichroic mirror 120-1 and is hence transmitted to the second dichroic mirror 120-2. The transmission curve 904 of the second dichroic mirror 120-2 is selected to transmit green to yellow light and reflect red (or blue light). This will have the effect of filtering the yellow to red light, converting it into a red color upon reflection to the integrator 124-1.

The choice of where to place a long wavelength cutoff of the transmission curve 904 of the second dichroic mirror 120-2 may depend on the phosphor material chosen for the phosphor 110 of the first phosphor wheel 106-1 and on a desired color of red to be emitted by the third integrator 124-3. For example, when the system 100 is to be provided at or in a projector that is to be operated according to the REC.709 display standard, the long wavelength cutoff may be selected to be a shorter wavelength as the REC.709 display standard does not require deeply saturated colors. A projector that is to be operated according to the DCI P3 color standard may require a long wavelength cutoff at a longer wavelength, and a projector that is to be operated according to the REC.2020 may require a long wavelength cutoff at a wavelength that is longer still.

Attempting to achieve "deeper" reds (e.g. reds that are well above 620 nm) reveals a further challenge of LaPh display systems as phosphor materials tend to be red deficient. Increasing the percent of display time allocated to red may alleviate some of this problem, but in general this solution may be not sufficient. Adding more pump lasers (e.g. more than one second laser 104-2 may be used) may also mitigate the problem, up until a quenching limit is reached. However, as provided herein, using the red laser 104-4 as a direct red laser source may help achieve a given white balance and/or white color point.

During the red display time, the red laser 104-4 (e.g. of wavelength 638 nm) will simultaneously be on with the laser 104-3, and light from the red laser 104-4 is directed to the third dichroic mirror 120-3. The third dichroic mirror 120-3 may have a transmission long wavelength cutoff chosen to be below the wavelength of the red laser 104-4. The red light from the of the red laser 104-4 will hence reflected and/or directed to the fourth dichroic mirror 120-4, which also has a transmission long wavelength cutoff chosen to be below the wavelength of the red laser 104-4. The red light from the red laser 104-4 will again be reflected, towards integrator 124-2.

During the green display time, the third blue laser 104-3 (e.g. of wavelength 455 nm) is on and light therefrom is directed towards the third dichroic mirror 120-3, which comprises a band-pass filter having a transmission low wavelength cutoff chosen to be above the wavelength of the third blue laser 104-3, and a transmission high wavelength cutoff chosen to reflect the light emitted by the red laser 104-4. Light from the third blue laser 104-3 will reflect off the third dichroic mirror 120-3 and be directed to the green phosphor 110 of the second phosphor wheel 106-1, and the green phosphor 110 will fluoresce, emitting green to yellow light. This green to yellow light is directed towards, and is transmitted through, the third dichroic mirror 120-3 and impinges on the fourth dichroic mirror 120-4, acts as a yellow notch filter and hence reflects the green light towards integrator 124-2 (as the yellow light is transmitted).

During the blue display time, the first blue laser 104-1 (e.g. of wavelength 465 nm) is on and light therefrom is directed towards the first dichroic mirror 120-1, which comprises a band-pass filter having a transmission wavelength cutoff chosen to be above the wavelength of the first blue laser 104-1. Light from the first blue laser 104-1 will reflect off the first dichroic mirror 120-1 and be directed to the second dichroic mirror 120-2. The transmission low wavelength cutoff of the second dichroic mirror 120-2 is selected chosen to be above the wavelength of the first blue laser 104-1 and hence the light from the first blue laser 104-1 is reflected by the second dichroic mirror 120-2 towards the integrator 124-1.

Hence, by having two independent phosphor wheels 106, the choice of phosphors 108, 110 may be optimized for the individual red and green colors as compared to using phosphor to provide both red and green (e.g. and blue).

A final colorimetry of a projector that uses the system 100 (or the system 200) may will depend on the wavelengths of the lasers 104 that are selected, types of phosphor materials that are selected, and the cutoff wavelengths of the various dichroic mirrors 120. It is hence understood the present specification provides systems 100, 200 that allow for flexibility in optimizing for different operating color points, brightness, colorimetry, etc.

As already discussed, phosphor materials are temperature sensitive. It is furthermore understood that the lasers 104 may be temperature sensitive. In choosing the wavelengths cutoffs for the various dichroic mirrors 120, it may be important to provide heat sinks 122 to absorb rejected light. For example, light that does not get directed towards the integrators 124 will be absorbed somewhere inside the system 100 (or the system 200) and converted to heat. Hence, the wavelengths cutoffs may be chosen such that waste light is filtered by transmission through either the third dichroic mirror 120-3 or the fourth dichroic mirror 120-4. A light absorbing heat sink 122 added to the dichroic mirrors 120-3, 120-4 may allow for optimal thermal management. Put another way, in some examples, the system 100, or the system 200, may further comprise one or more heat sinks 122 arranged to absorb one or more of heat and waste light from one or more of the first dichroic mirror 120-1, the second dichroic mirror 120-2, the third dichroic mirror 120-3, and the fourth dichroic mirror 120-4.

Hence, use of two independent phosphor wheels 106 may reduce the thermal load on each individual phosphor wheel 106 (e.g. with unsegmented phosphors 108, 110), which may enhance efficiency and brightness as compared to when only one phosphor wheel 106 is used (e.g. with segmented phosphors). A speed at switching between colors is limited in the systems 100, 200 by the ability to turn the lasers 104 on and off, however by selecting lasers 104 that have short on and of times, turning a laser 104 on and off may occur in about a 1 µs time period, which may reduce and/or eliminate the spoke time issues experienced in prior art LaPh systems. Reducing and/or eliminating spoke time may increases the amount of time allocated to pure colors, further increasing system efficiency and brightness. Such fast switching may also enable fast(er) color cycling rates. In a practical system, a color cycling rate may be limited by a switching rate of an SLM (e.g. time to switch between sub-images), hence with switching times of the lasers 104 being about 1 µs, the switching time of a projector that uses the system 100 (or the system 200) may be independent of the switching times of the lasers 104.

As should by now be apparent, the operations and functions of the devices described herein are sufficiently complex as to require their implementation on a computer system, and cannot be performed, as a practical matter, in the human mind. In particular, computing devices such as set forth herein are understood as requiring and providing speed and accuracy and complexity management that are not obtainable by human mental steps, in addition to the inherently digital nature of such operations (e.g., a human mind cannot interface directly with digital projectors, or lasers, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A dual phosphor wheel projection system comprising:
a first laser to generate first blue light;
a second laser to generate second blue light;
a third laser to generate third blue light;
a fourth laser to generate first red light;
a first phosphor arranged on a first phosphor wheel;
a second phosphor arranged on a second phosphor wheel;
a first dichroic mirror;
a second dichroic mirror; and
a third dichroic mirror;
at least one light integrator,
wherein the first dichroic mirror is configured to direct the first blue light from the first laser to the second dichroic mirror, and the second dichroic mirror is configured to direct the first blue light from the first dichroic mirror to the at least one light integrator,
wherein the first dichroic mirror is further configured to direct the second blue light from the second laser to the first phosphor, arranged on the first phosphor wheel, the first phosphor configured to convert the second blue light to longer wavelengths that includes second red light, wherein the second dichroic mirror is further configured to direct the second red light to the at least one light integrator and transmit others of the longer wavelengths, wherein the at least one light integrator combines the first red light and the second red light, wherein the third dichroic mirror is configured to: direct the first red light from the fourth laser to the at least one light integrator; and direct the third blue light from the third laser to the second phosphor, arranged on the second phosphor wheel, wherein the second phosphor configured to convert the third blue light to respective longer wavelengths that includes green light, wherein the third dichroic mirror is further configured to transmit the green light to the at least one light integrator.

2. The dual phosphor wheel projection system of claim 1, further comprising a fourth dichroic mirror, wherein the third dichroic mirror is configured to direct the first red light from the fourth laser to the at least one light integrator via the fourth dichroic mirror, and the fourth dichroic mirror is configured to direct the first red light from the third dichroic mirror to the at least one light integrator, and wherein the third dichroic mirror is further configured to transmit the green light to the at least one light integrator via the fourth dichroic mirror, the fourth dichroic mirror further configured to direct the green light to the at least one light integrator and transmit others of the respective longer wavelengths.

3. The dual phosphor wheel projection system of claim 2, wherein one or more of the third dichroic mirror and the fourth dichroic mirror is further configured to refine the green light to shift a peak wavelength thereof.

4. The dual phosphor wheel projection system of claim 2, further comprising one or more heat sinks arranged to absorb one or more of heat and waste light from one or more of the second dichroic mirror, and the fourth dichroic mirror.

5. The dual phosphor wheel projection system of claim 1, wherein the at least one light integrator comprises:
a first light integrator configured to receive the first blue light and the second red light from the second dichroic mirror;
a second light integrator configured to receive the green light and the first red light from the third dichroic mirror; and
a third light integrator to combine respective light from the first light integrator and the second light integrator.

6. The dual phosphor wheel projection system of claim 1, wherein the first red light and the second red light supplement each other.

7. The dual phosphor wheel projection system of claim 1, further comprising a controller configured to:
during a blue time period, control the first laser to emit the first blue light;
during a red time period, control the second laser to emit the second blue light and control the fourth laser to emit the first red light; and
during a green time period, control the third laser to emit the third blue light.

8. The dual phosphor wheel projection system of claim 1, further comprising one or more heat sinks arranged to absorb one or more of heat and waste light from one or more of the first dichroic mirror, the second dichroic mirror, and the third dichroic mirror.

9. The dual phosphor wheel projection system of claim 1, wherein one or more of first dichroic mirror and the second dichroic mirror is further configured to refine the second red light to shift a peak wavelength thereof.

10. The dual phosphor wheel projection system of claim 1, wherein the second laser is operated at a power that is below a quenching limit of the first phosphor, and the third laser is operated at a respective power that is below a respective quenching limit of the second phosphor.

11. The dual phosphor wheel projection system of claim 1, wherein the first phosphor is configured to emit light in a range of yellow to red wavelengths.

12. The dual phosphor wheel projection system of claim 1, wherein the second phosphor is configured to emit light in a range of green to yellow wavelengths.

13. The dual phosphor wheel projection system of claim 1, wherein the at least one light integrator is arranged to provide light received at the at least one light integrator to a spatial light modulator.

* * * * *